(12) United States Patent
Matsushita

(10) Patent No.: US 10,408,627 B2
(45) Date of Patent: Sep. 10, 2019

(54) INERTIAL DEVICE TO ESTIMATE POSITION BASED ON CORRECTED MOVEMENT VELOCITY

(71) Applicant: Yusuke Matsushita, Tochigi (JP)

(72) Inventor: Yusuke Matsushita, Tochigi (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 15/358,893

(22) Filed: Nov. 22, 2016

(65) Prior Publication Data

US 2017/0153110 A1    Jun. 1, 2017

(30) Foreign Application Priority Data

Nov. 30, 2015    (JP) .................................. 2015-233496
Aug. 26, 2016    (JP) .................................. 2016-166207

(51) Int. Cl.
G01C 21/16    (2006.01)
G01C 21/20    (2006.01)

(52) U.S. Cl.
CPC ......... *G01C 21/206* (2013.01); *G01C 21/165* (2013.01)

(58) Field of Classification Search
None
See application file for complete search history.

(56) References Cited

U.S. PATENT DOCUMENTS

2002/0143491 A1* 10/2002 Scherzinger ........... G01C 21/16
                                                  702/160
2010/0198511 A1*  8/2010 Hunter ................. G01C 21/265
                                                  701/472

(Continued)

FOREIGN PATENT DOCUMENTS

JP         5059933      10/2012
JP      2013-050307      3/2013
(Continued)

OTHER PUBLICATIONS

Greg Welch et al., "An Introduction to the Kalman Filter", Department of Computer Science, University of North Carolina at Chapel Hill, Jul. 24, 2006, pp. 1-16.

(Continued)

*Primary Examiner* — Nicholas K Wiltey

(74) *Attorney, Agent, or Firm* — Oblon, McClelland, Maier & Neustadt, L.L.P.

(57) ABSTRACT

To improve indoor positioning accuracy, an inertial device includes a traveling direction estimator configured to estimate a traveling direction and movement velocity, based on an output of a sensor, a position estimator configured to generate an estimated position of the inertial device by use of an inertial navigation system, based on the traveling direction and the movement velocity estimated by the traveling direction estimator, an absolute position information acquirer configured to acquire absolute position information which is provided externally, a position corrector configured to correct the estimated position based on the absolute position information and generate a corrected position, upon acquiring the absolute position information, and a traveling direction corrector configured to correct the traveling direction based on a gap between a direction from a predetermined position to the estimated position and a direction from the predetermined position to the corrected position.

12 Claims, 38 Drawing Sheets

(56) References Cited

U.S. PATENT DOCUMENTS

| | | | | |
|---|---|---|---|---|
| 2011/0285583 A1* | 11/2011 | Huang | | G01S 19/40 |
| | | | | 342/357.23 |
| 2011/0313716 A1* | 12/2011 | Smid | | G01C 21/165 |
| | | | | 702/141 |
| 2012/0277941 A1* | 11/2012 | Noffsinger | | B63B 49/00 |
| | | | | 701/21 |
| 2013/0211709 A1* | 8/2013 | Takahashi | | G01C 21/30 |
| | | | | 701/417 |
| 2014/0180626 A1 | 6/2014 | Kimishima | | |
| 2015/0198447 A1* | 7/2015 | Chen | | G01S 5/0252 |
| | | | | 701/472 |
| 2015/0330791 A1* | 11/2015 | Matsushita | | G01C 21/16 |
| | | | | 702/150 |
| 2015/0354951 A1* | 12/2015 | Ali | | G01C 21/16 |
| | | | | 702/141 |
| 2015/0354967 A1 | 12/2015 | Matsushita | | |
| 2015/0354980 A1* | 12/2015 | Wahdan | | G01C 17/38 |
| | | | | 324/202 |
| 2016/0216360 A1* | 7/2016 | Georgy | | G01S 19/45 |
| 2016/0265924 A1* | 9/2016 | Neyama | | G01C 21/28 |
| 2016/0273920 A1 | 9/2016 | Matsushita et al. | | |
| 2018/0222540 A1* | 8/2018 | Wolf | | B60R 25/10 |

FOREIGN PATENT DOCUMENTS

| | | |
|---|---|---|
| JP | 2014-142308 | 8/2014 |
| JP | 2014-167460 | 9/2014 |
| JP | 2014-167461 | 9/2014 |
| JP | 2015-111096 | 6/2015 |
| JP | 2015-121482 | 7/2015 |
| JP | 2015-152559 | 8/2015 |
| WO | WO 2015/098390 A1 | 7/2015 |
| WO | WO 2015/125947 A1 | 8/2015 |

OTHER PUBLICATIONS

I. M. Rekleitis, "A Particle Filter Tutorial for Mobile Robot Localization TR-CIM-04-02", Centre for Intelligent Machines, McGill University, pp. 1-36.

\* cited by examiner (1) VARIABLES IN SYSTEM STATE ESTIMATION MODEL (TIME UPDATE MODEL)

$\hat{x}_{k|k-1}$ : ESTIMATE (VECTOR) OF STATE AT PRESENT TIME  ...(1)-1

$f(\hat{x}_{k-1|k-1}, u_k, 0)$ : FORMULA FOR STATE ESTIMATION MODEL  ...(1)-2

$\hat{x}_{k-1|k-1}$ : ESTIMATE (VECTOR) OF STATE AT PREVIOUS TIME STEP  ...(1)-3

$u_k$ : INPUT VALUE (VECTOR) AT PRESENT TIME  ...(1)-4

(1) SYSTEM STATE ESTIMATION MODEL (TIME UPDATE MODEL)

$$\hat{x}_{k|k-1} = f(\hat{x}_{k-1|k-1}, u_k, 0) \quad \cdots (1)\text{-}5$$

DEFINITION OF ESTIMATE OF STATE AT PRESENT TIME $$x_{k|k-1} = \begin{bmatrix} w_k & x_k & y_k & z_k & bx_k & by_k & bz_k \end{bmatrix}^T \quad \cdots (1)\text{-}1$$

DEFINITION OF INPUT VALUE $$u_k = \begin{bmatrix} \omega_{xk} \\ \omega_{yk} \\ \omega_{zk} \end{bmatrix} = \begin{bmatrix} \omega_{0xk} - bx_k \\ \omega_{0yk} - by_k \\ \omega_{0zk} - bz_k \end{bmatrix} \quad \cdots (1)\text{-}4$$

SYSTEM STATE ESTIMATION MODEL (TIME UPDATE MODEL)

$x_{k|k-1} = A x_{k-1|k-1}$ $$\begin{bmatrix} w_k \\ x_k \\ y_k \\ z_k \\ bx_k \\ by_k \\ bz_k \end{bmatrix} = \frac{1}{2} \begin{bmatrix} 2 & -\omega_x t & -\omega_y t & -\omega_z t & 0 & 0 & 0 \\ \omega_x t & 2 & -\omega_z t & \omega_y t & 0 & 0 & 0 \\ \omega_y t & \omega_z t & 2 & -\omega_x t & 0 & 0 & 0 \\ \omega_z t & -\omega_y t & \omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix} \begin{bmatrix} w_{k-1} \\ x_{k-1} \\ y_{k-1} \\ z_{k-1} \\ bx_{k-1} \\ by_{k-1} \\ bz_{k-1} \end{bmatrix} \quad \cdots (1)\text{-}5$$

($C_1, C_2, C_3$, ARE ARBITRARY CONSTANTS)

(2) PARTIAL DERIVATIVE MATRIX (JACOBIAN) FOR TIME UPDATE $F_k$ : PARTIAL DERIVATIVE MATRIX (JACOBIAN) FOR TIME UPDATE ...(2)-1

$\left.\dfrac{\partial f}{\partial x}\right|_{\hat{x}_{k-1|k-1}, u_k}$ : OBTAINING JACOBIAN BY CALCULATING PARTIAL DERIVATIVE OF FORMULA FOR STATE ESTIMATION MODEL AT PRESENT TIME ...(2)-2

$$F_k = \left.\dfrac{\partial f}{\partial x}\right|_{\hat{x}_{k-1|k-1}, u_k} \quad \cdots (2)\text{-}3$$

SYSTEM STATE ESTIMATION MODEL (TIME UPDATE MODEL)

$x_{k|k-1} = A x_{k-1|k-1}$ ...(1)-5

$$\begin{bmatrix} w_k \\ x_k \\ y_k \\ z_k \\ bx_k \\ by_k \\ bz_k \end{bmatrix} = \dfrac{1}{2} \begin{bmatrix} 2 & -\omega_x t & -\omega_y t & -\omega_z t & 0 & 0 & 0 \\ \omega_x t & 2 & \omega_z t & -\omega_y t & 0 & 0 & 0 \\ \omega_y t & -\omega_z t & 2 & \omega_x t & 0 & 0 & 0 \\ \omega_z t & \omega_y t & -\omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix} \begin{bmatrix} w_{k-1} \\ x_{k-1} \\ y_{k-1} \\ z_{k-1} \\ bx_{k-1} \\ by_{k-1} \\ bz_{k-1} \end{bmatrix}$$

$= f$ ...(1)-5

$(C_1, C_2, C_3,$ ARE ARBITRARY CONSTANTS)

(3) ERROR COVARIANCE MATRIX ESTIMATION MODEL (ACCURACY OF ESTIMATE)

$P_{k|k-1}$ : ERROR COVARIANCE MATRIX AT PRESENT TIME ...(3)-1

$P_{k-1|k-1}$ : ERROR COVARIANCE MATRIX AT PREVIOUS TIME STEP ...(3)-2

$F_k^T$ : TRANSPOSED MATRIX OF PARTIAL DERIVATIVE MATRIX (JACOBIAN) FOR TIME UPDATE ...(3)-3

$Q_k$ : PROCESS NOISE (MATRIX) ...(3)-4

(3) ERROR COVARIANCE MATRIX ESTIMATION MODEL (ACCURACY OF ESTIMATE)

$$P_{k|k-1} = F_k P_{k-1|k-1} F_k^T + Q_k \quad \cdots (3)\text{-}5$$

$$Q_k = \begin{bmatrix} q_{wk} & 0 & 0 & 0 & 0 & 0 & 0 \\ 0 & q_{xk} & 0 & 0 & 0 & 0 & 0 \\ 0 & 0 & q_{yk} & 0 & 0 & 0 & 0 \\ 0 & 0 & 0 & q_{zk} & 0 & 0 & 0 \\ 0 & 0 & 0 & 0 & q_{bxk} & 0 & 0 \\ 0 & 0 & 0 & 0 & 0 & q_{byk} & 0 \\ 0 & 0 & 0 & 0 & 0 & 0 & q_{bzk} \end{bmatrix} \quad \cdots (3)\text{-}4$$

(1) MEASUREMENT RESIDUAL $\tilde{y}_k$ : MEASUREMENT RESIDUAL (VECTOR) ...(1)-1

$z_k$ : MEASUREMENT (VECTOR) ...(1)-2

$h(\hat{x}_{k|k-1}, 0)$ : MEASUREMENT (VECTOR) AT PREVIOUS TIME STEP
...(1)-3

(1) MEASUREMENT RESIDUAL $$\tilde{y}_k = z_k - h(\hat{x}_{k|k-1}, 0) \quad \cdots(1)\text{-}4$$

MEASUREMENT (VECTOR)

$$z_k = \frac{1}{\sqrt{a_x a_x + a_y a_y + a_z a_z}} \begin{bmatrix} a_x \\ a_y \\ a_z \end{bmatrix} \quad \cdots(1)\text{-}2$$

MEASUREMENT (VECTOR)
AT PREVIOUS TIME STEP $$h = \begin{bmatrix} 2x_k z_k - 2w_k y_k \\ 2y_k z_k + 2w_k x_k \\ 1 - 2(x_k x_k + y_k y_k) \end{bmatrix} \quad \cdots(1)\text{-}3$$

FIG.9

(1) MEASUREMENT RESIDUAL $\tilde{y}_k$ : MEASUREMENT RESIDUAL (VECTOR) ...(1)-1

$z_k$ : MEASUREMENT (VECTOR) ...(1)-2

$h(\hat{x}_{k|k-1}, 0)$ : MEASUREMENT (VECTOR) AT PREVIOUS TIME STEP
...(1)-3

(1) MEASUREMENT RESIDUAL $$\tilde{y}_k = z_k - h(\hat{x}_{k|k-1}, 0) \quad \cdots (1)\text{-}4$$

MEASUREMENT (VECTOR)

$$z_k = \begin{bmatrix} TRIAD_x \\ TRIAD_y \\ TRIAD_z \end{bmatrix} \quad \cdots (1)\text{-}2$$

MEASUREMENT (VECTOR)
AT PREVIOUS TIME STEP $$h = \begin{bmatrix} 1 - 2(y_k y_k + z_k z_k) \\ 2x_k y_k - 2w_k z_k \\ 2x_k z_k + 2w_k y_k \end{bmatrix} \quad \cdots (1)\text{-}3$$

FIG.12

$$DCM2 = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ 0 & -\sin\phi & \cos\phi \end{bmatrix} \begin{bmatrix} \cos\psi & \cos\psi & 0 \\ -\sin\psi & \cos\psi & 0 \\ 0 & 0 & 1 \end{bmatrix}$$

$$= \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

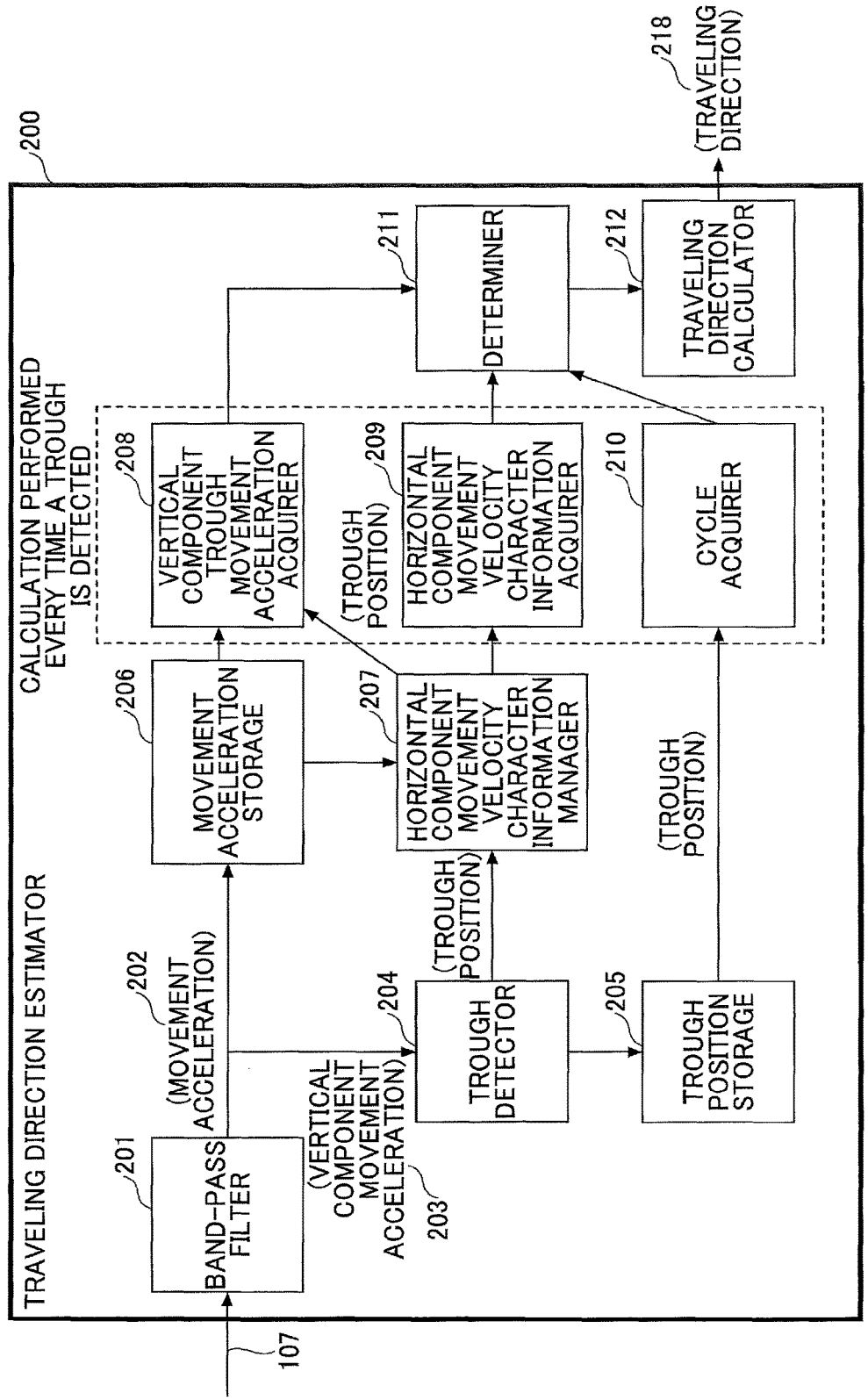

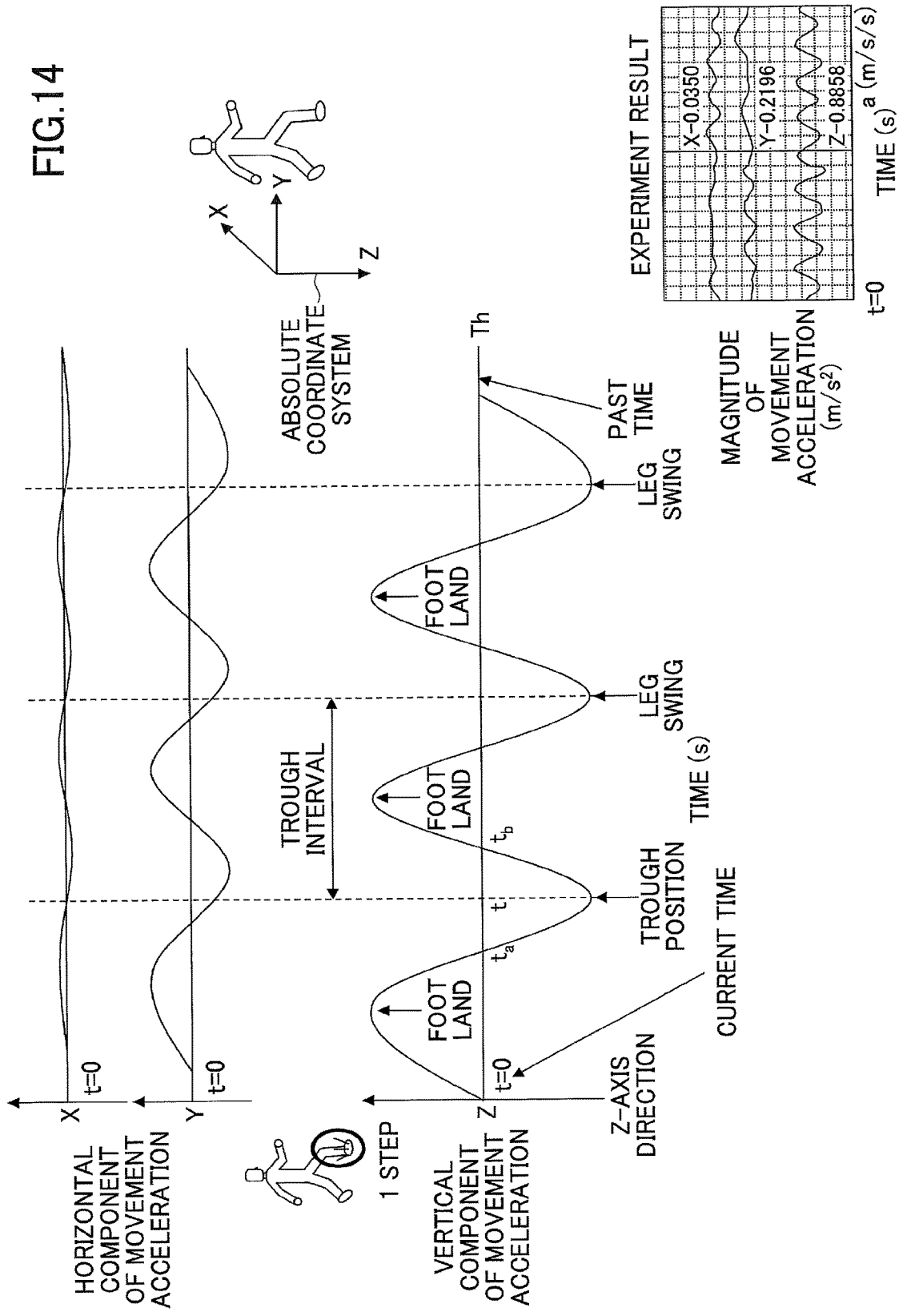

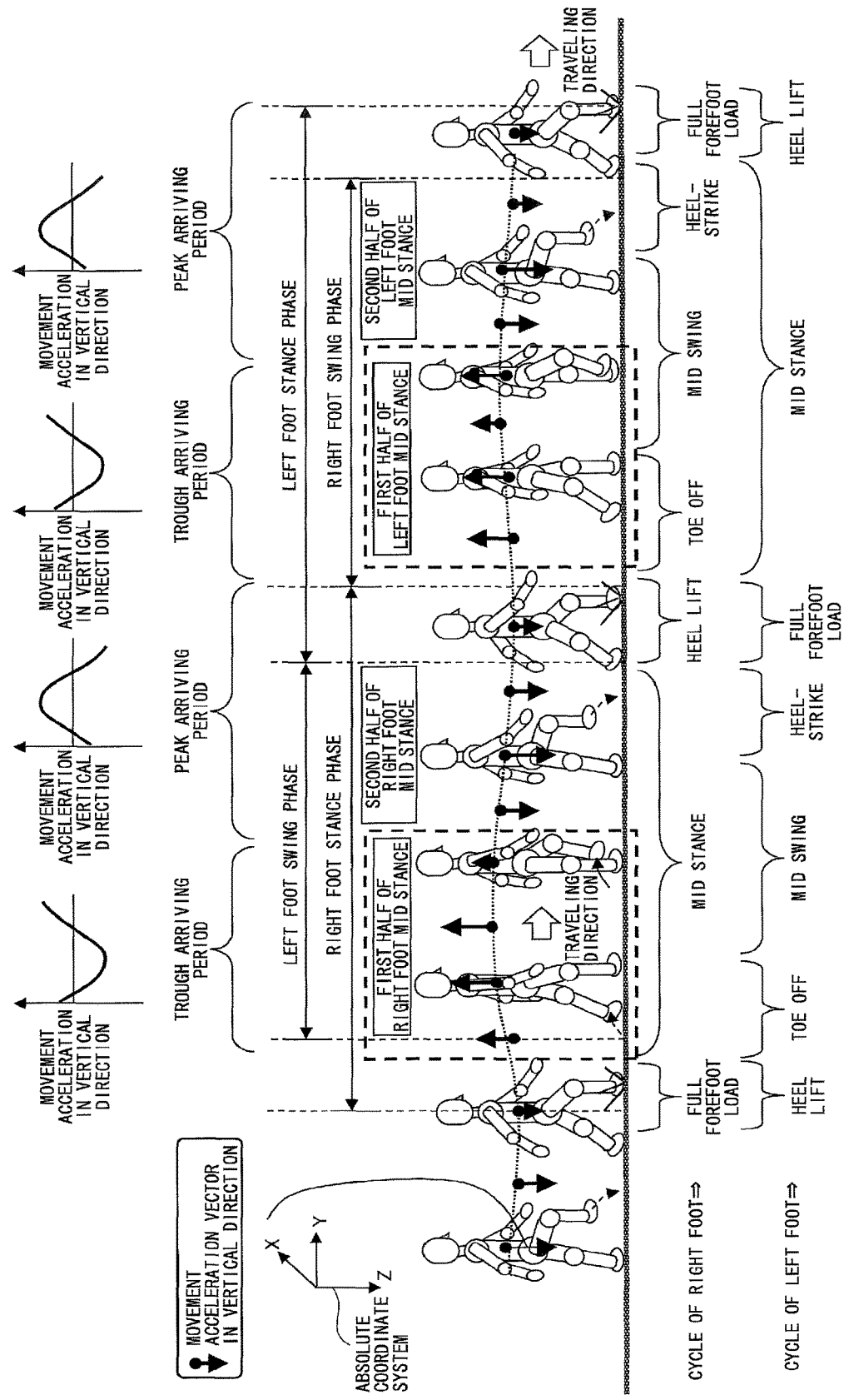

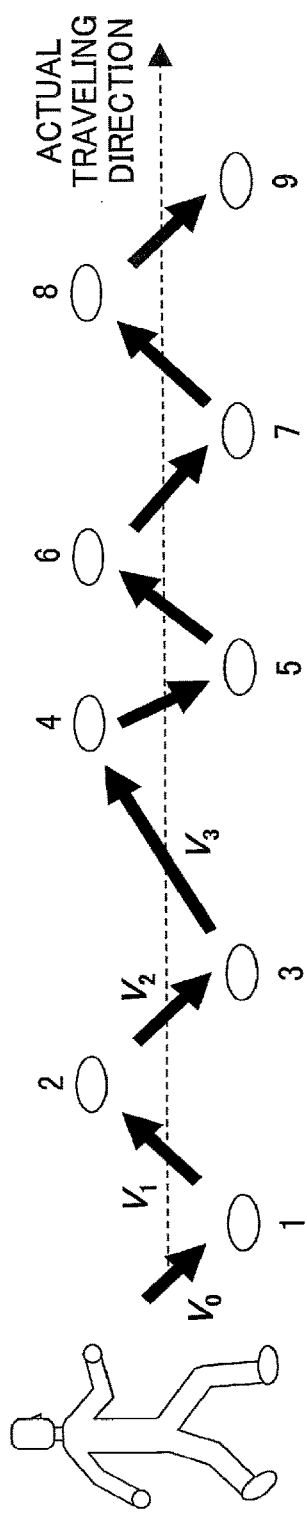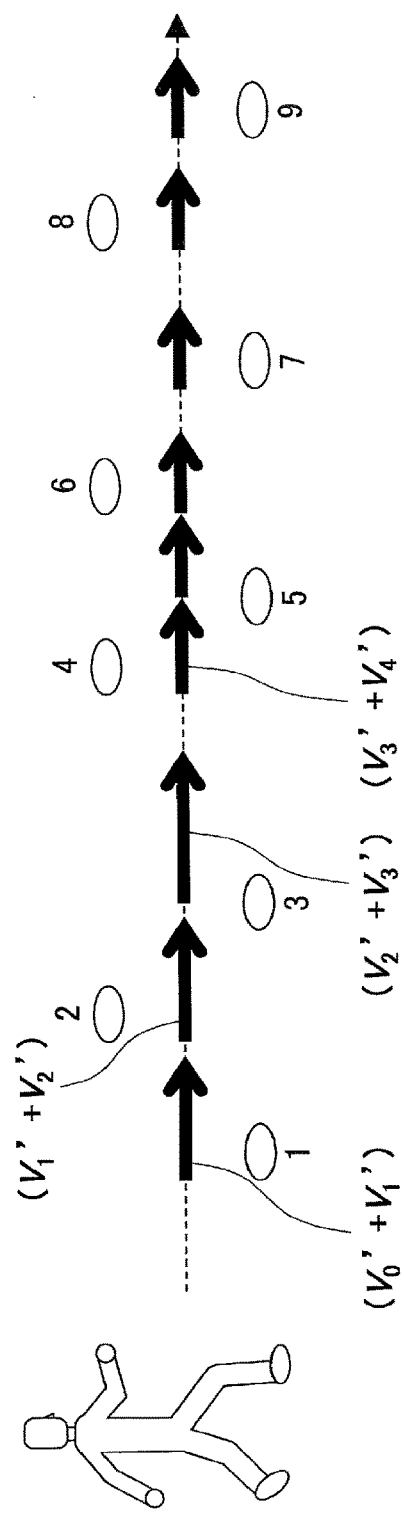
FIG.21A  FIG.21B  FIG.21C

FIG.24

| INDEX | SEX | AGE | HEIGHT | VELOCITY PARAMETER $P_a$ | INTENSITY PARAMETER $P_b$ | CYCLE PARAMETER $P_c$ | AMPLITUDE PARAMETER $P_d$ | VELOCITY GENERATING COEFFICIENT $C_a$ | VELOCITY GENERATING COEFFICIENT $C_b$ | VELOCITY GENERATING COEFFICIENT $C_c$ |
|---|---|---|---|---|---|---|---|---|---|---|
| 1 | MALE | 20 | 170 | 0.6 | 0.2 | 1 | 3 | 0.2 | 0.2 | 0.6 |
| 5 | MALE | 20 | 170 | 0.6 | 0.2 | 2 | 1 | 0.5 | 0.3 | 0.2 |
| 10 | MALE | 20 | 170 | 0.2 | 0.1 | 2 | 1 | 0.5 | 0.3 | 0.2 |
| ... | ... | ... | ... | ... | ... | ... | ... | ... | ... | ... |

(1) VARIABLES IN SYSTEM STATE ESTIMATION MODEL (TIME UPDATE MODEL)

$\hat{x}_{k|k-1}$ : ESTIMATE (VECTOR) OF STATE AT PRESENT TIME  ...(1)-1

$f(\hat{x}_{k-1|k-1}, u_k, 0)$ : FORMULA FOR STATE ESTIMATION MODEL  ...(1)-2

$\hat{x}_{k-1|k-1}$ : ESTIMATE (VECTOR) OF STATE AT PREVIOUS TIME STEP  ...(1)-3

$u_k$ : INPUT VALUE (VECTOR) AT PRESENT TIME  ...(1)-4

(1) SYSTEM STATE ESTIMATION MODEL (TIME UPDATE MODEL)

$$\hat{x}_{k|k-1} = f(\hat{x}_{k-1|k-1}, u_k, 0) \quad \cdots(1)\text{-}5$$

DEFINITION OF ESTIMATE OF STATE AT PRESENT TIME $$x_{k|k-1} = \begin{bmatrix} X & Y & Z \end{bmatrix}^T \quad \cdots(1)\text{-}1$$

DEFINITION OF INPUT VALUE ← TRAVELING VELOCITY VECTOR (m/s)

$$u_k = \begin{bmatrix} V_x & V_y & V_z \end{bmatrix}^T \quad \cdots(1)\text{-}4$$

SYSTEM STATE ESTIMATION MODEL (TIME UPDATE MODEL)

$$x_{k|k-1} = x_{k-1|k-1} + u_k t \quad \cdots(1)\text{-}5$$

FIG.29

(3) ERROR COVARIANCE MATRIX ESTIMATION MODEL (ACCURACY OF ESTIMATE)

$P_{k|k-1}$ : ERROR COVARIANCE MATRIX AT PRESENT TIME ...(3)-1

$P_{k-1|k-1}$ : ERROR COVARIANCE MATRIX AT PREVIOUS TIME STEP ...(3)-2

$F_k^T$ : TRANSPOSED MATRIX OF PARTIAL DERIVATIVE MATRIX (JACOBIAN) FOR TIME UPDATE ...(3)-3

$Q_k$ : PROCESS NOISE (MATRIX) ...(3)-4

(3) ERROR COVARIANCE MATRIX ESTIMATION MODEL (ACCURACY OF ESTIMATE)

$$P_{k|k-1} = F_k P_{k-1|k-1} F_k^T + Q_k$$

...(3)-5

$$Q_k = \sigma_v = \begin{bmatrix} q_{vx} & 0 & 0 \\ 0 & q_{vy} & 0 \\ 0 & 0 & q_{vz} \end{bmatrix}$$

(1) MEASUREMENT RESIDUAL $\tilde{y}_k = z_k - h(\hat{x}_{k|k-1}, 0)$ ...(1)-4

$\tilde{y}_k$ : MEASUREMENT RESIDUAL (VECTOR) ...(1)-1

$z_k$ : MEASUREMENT (VECTOR) ...(1)-2

$h(\hat{x}_{k|k-1}, 0)$ : MEASUREMENT (VECTOR) AT PREVIOUS TIME STEP ...(1)-3

MEASUREMENT (VECTOR)

$z_k = [X_1 \ Y_1 \ Z_1]^T$ ...(1)-2

MEASUREMENT (VECTOR)
AT PREVIOUS TIME STEP $h = [X \ Y \ Z]^T$ ...(1)-3

FIG.32

(1) VARIABLES IN SYSTEM STATE ESTIMATION MODEL (TIME UPDATE MODEL)

$\hat{x}_{k|k-1}$ : ESTIMATE (VECTOR) OF STATE AT PRESENT TIME $f(\hat{x}_{k-1|k-1}, u_k, 0)$ : FORMULA FOR STATE ESTIMATION MODEL $\hat{x}_{k-1|k-1}$ : ESTIMATE (VECTOR) OF STATE AT PREVIOUS TIME STEP $u_k$ : INPUT VALUE (VECTOR) AT PRESENT TIME

(2) PARTIAL DERIVATIVE MATRIX (JACOBIAN) FOR TIME UPDATE

$F_k$ : PARTIAL DERIVATIVE MATRIX (JACOBIAN) FOR TIME UPDATE $\left.\dfrac{\partial f}{\partial x}\right|_{\hat{x}_{k-1|k-1}, u_k}$ : OBTAINING JACOBIAN BY CALCULATING PARTIAL DERIVATIVE OF FORMULA FOR STATE ESTIMATION MODEL AT PRESENT TIME

(3) ERROR COVARIANCE MATRIX ESTIMATION MODEL (ACCURACY OF ESTIMATE)

$P_{k|k-1}$ : ERROR COVARIANCE MATRIX AT PRESENT TIME $P_{k-1|k-1}$ : ERROR COVARIANCE MATRIX AT PREVIOUS TIME STEP $F_k^T$ : TRANSPOSED MATRIX OF PARTIAL DERIVATIVE MATRIX (JACOBIAN) FOR TIME UPDATE $Q_k$ : PROCESS NOISE (MATRIX):
DIAGONAL MATRIX REPRESENTING STANDARD DEVIATION IN EACH COMPONENT OF ESTIMATE (VECTOR) OF STATE (PRIOR ART)

(1) MEASUREMENT RESIDUAL $\tilde{y}_k$ : MEASUREMENT RESIDUAL (VECTOR)
$z_k$ : MEASUREMENT (VECTOR)
$h(\hat{x}_{k|k-1}, 0)$ : MEASUREMENT (VECTOR) AT PREVIOUS TIME STEP (2) PARTIAL DERIVATIVE MATRIX (JACOBIAN) FOR MEASUREMENT UPDATE $H_k$ : PARTIAL DERIVATIVE MATRIX (JACOBIAN) FOR MEASUREMENT UPDATE
$\left.\frac{\partial h}{\partial x}\right|_{\hat{x}_{k|k-1}}$ : OBTAINING JACOBIAN BY CALCULATING PARTIAL DERIVATIVE OF FORMULA FOR STATE ESTIMATION MODEL AT PRESENT TIME (3) RESIDUAL COVARIANCE $S_k$ : RESIDUAL COVARIANCE
$P_{k|k-1}$ : ERROR COVARIANCE MATRIX AT PRESENT TIME
$H_k^T$ : TRANSPOSED MATRIX OF PARTIAL DERIVATIVE MATRIX (JACOBIAN) FOR MEASUREMENT UPDATE
$R_k$ : MEASUREMENT NOISE (MATRIX)

(4) KALMAN GAIN $K_k$ : KALMAN GAIN (MATRIX)

(5) UPDATED ESTIMATE OF STATE $\hat{x}_{k|k}$ : UPDATED ESTIMATE (VECTOR) OF STATE
$\hat{x}_{k|k-1}$ : ESTIMATE (VECTOR) OF STATE AT PREVIOUS TIME STEP (6) UPDATED ERROR COVARIANCE MATRIX $P_{k|k}$ : UPDATED ERROR COVARIANCE MATRIX
$I$ : IDENTITY MATRIX (PRIOR ART)

INERTIAL DEVICE TO ESTIMATE POSITION BASED ON CORRECTED MOVEMENT VELOCITY

CROSS-REFERENCE TO RELATED APPLICATIONS

The present application claims the benefit of priority under 35 U.S.C. § 119 of Japanese Patent Application No. 2015-233496, filed Nov. 30, 2015, and Japanese Patent Application No. 2016-166207, filed Aug. 26, 2016, the contents of which are incorporated herein by reference in their entirety.

BACKGROUND OF THE INVENTION

1. Field of the Invention

The present disclosure relates to inertial devices, recording media, and methods for positioning.

2. Description of the Related Art

There is a technology called a pedestrian dead reckoning (PDR) system for estimating a position of a pedestrian in a situation where a global positioning system (GPS) is not available, such as at an indoor environment or in the basement, by use of measurements of an accelerometer, a gyroscope, and a magnetometer. In the PDR system, an arithmetic operation is performed on the measurements in order to estimate a traveling direction and a traveling velocity vector with respect to a pedestrian, so as to perform time integration on the traveling velocity vector of the traveling velocity in order to estimate a current position. Here, a sensor which has an integrated function of an accelerometer, a gyroscope, and a magnetometer is called a motion sensor.

With regard to an estimation of a direction in the PDR system, the traveling direction of a pedestrian is determined based on an absolute azimuth detected by the magnetometer and the gyroscope. That is to say, even though an amount of directional changes is detected by the gyroscope, a current position may not be estimated correctly unless the absolute azimuth is detected by the magnetometer.

There is a technology for improving accuracy of an estimation of the absolute azimuth by use of a map-matching method (e.g. Japanese Patent No. 5059933). According to disclosure in Japanese Patent No. 5059933, there is a technique of performing map-matching on map data with respect to a straight walking movement detected in the PDR system in order to correct a traveling direction of a user based on a direction between two positions matched on the map data.

SUMMARY OF THE INVENTION

In view of such a background, one aspect of the present invention provides an inertial device including a traveling direction estimator configured to estimate a traveling direction and movement velocity, based on an output of a sensor, a position estimator configured to generate an estimated position of the inertial device by use of an inertial navigation system, based on the traveling direction and the movement velocity estimated by the traveling direction estimator, an absolute position information acquirer configured to acquire absolute position information which is provided externally, a position corrector configured to correct the estimated position based on the absolute position information and generate a corrected position, upon acquiring the absolute position information, and a traveling direction corrector configured to correct the traveling direction based on a gap between a direction from a predetermined position to the estimated position and a direction from the predetermined position to the corrected position.

BRIEF DESCRIPTION OF THE DRAWINGS

FIG. 5 is a drawing for explaining items included in a system state estimation model of a general expression of an extended Kalman filter, according to the embodiment;

FIG. 6 is a drawing for explaining a partial derivative matrix (i.e. Jacobian) in a time-updating procedure of the general expression of the extended Kalman filter, according to the embodiment;

FIG. 7 is a drawing for explaining an error covariance matrix in the general expression of the extended Kalman filter, according to the embodiment;

FIG. 8 is a drawing for explaining a measurement residual in the general expression of the extended Kalman filter, according to the embodiment;

FIG. 9 is a drawing for explaining the measurement residual in the general expression of the extended Kalman filter, according to the embodiment;

FIG. 12 is a drawing illustrating an example of a rotation matrix DCM2, according to the embodiment;

FIG. 13 is a drawing illustrating an example of functions of a traveling direction estimator, according to the embodiment;

FIG. 14 is a drawing illustrating an example of waveforms illustrating changes in a vertical component (Z) and horizontal components (X, Y) of movement acceleration, according to the embodiment;

FIG. 15 is a drawing illustrating an example of movement characteristics in a vertical direction of a walking motion, according to the embodiment;

FIGS. 21A through 21C are drawings illustrating examples of a traveling velocity estimation procedure, according to the embodiment;

FIG. 24 is a drawing illustrating an example of a parameter database (DB), according to the embodiment;

FIG. 29 is a drawing illustrating an example of calculation of a current position in a time-updating procedure, according to the embodiment;

FIG. 31 is a drawing illustrating an example of calculation of a current position in the time-updating procedure, according to the embodiment;

FIG. 32 is a drawing illustrating an example of calculation of a current position in a measurement-updating procedure, according to the embodiment;

FIG. 39 is a drawing illustrating variables used in a time-updating procedure, according to prior art; and FIG. 40 is a drawing illustrating variables used in a measurement-updating procedure, according to prior art.

DESCRIPTION OF THE EMBODIMENTS

A problem with regard to the method of correcting a direction disclosed in Japanese Patent No. 5059933 is, not only that map data is required, but also that a direction may not be properly corrected in a case where a position is incorrectly matched on the map data due to decreased positioning accuracy in the PDR system.

In view of such a problem, the object of the present invention is to provide an inertial device having improved indoor positioning accuracy.

In the following, an embodiment of the present invention will be described with reference to accompanying drawings.

Figure 1:
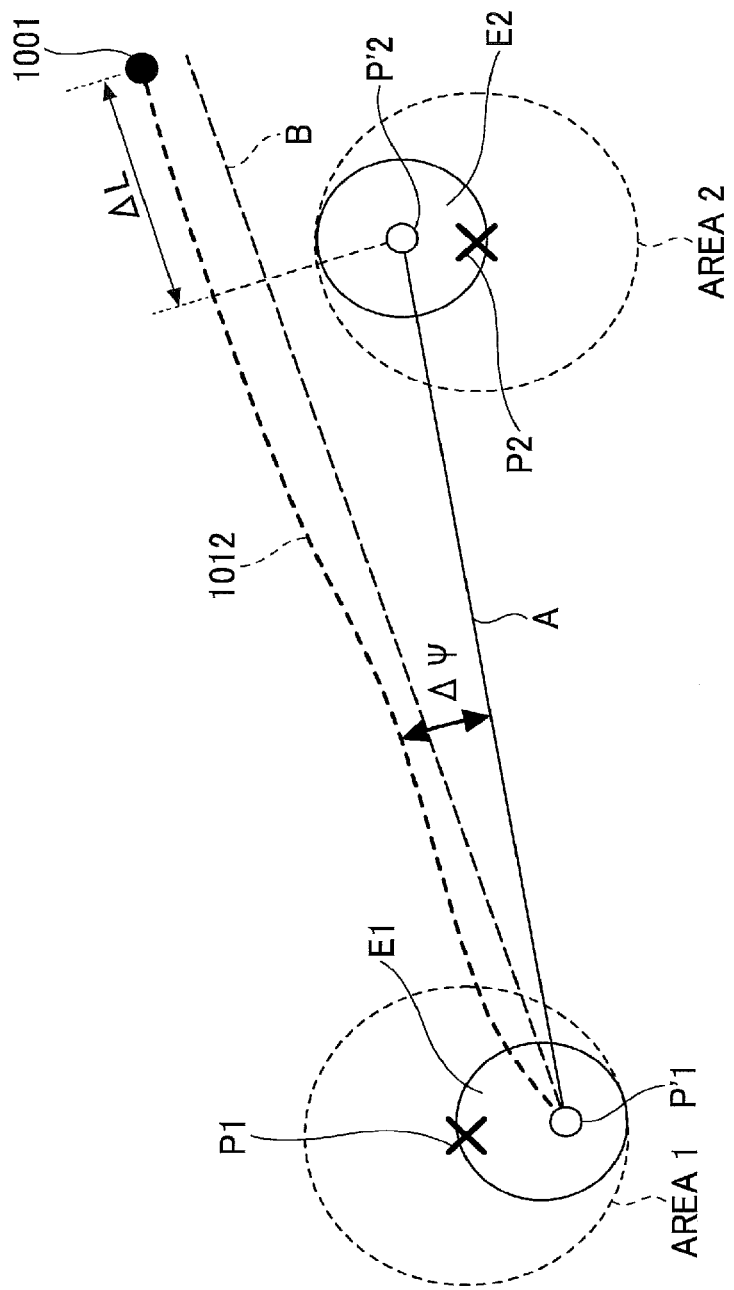
FIG. 1 is a drawing illustrating an example of an estimation error in a PDR system between two locations with regard to a distance and a direction, according to an embodiment.

First, an estimation error in a PDR system between two locations with regard to a distance and a direction will be described with reference to FIG. 1. FIG. 1 is a drawing illustrating an example of an estimation error in a PDR system between two locations with regard to a distance and a direction.

In a receiving area AREA1 or AREA2, an inertial device may receive absolute position information wirelessly via radio waves, sound waves, etc., upon entering. The absolute position information includes an absolute position P1 or P2. The absolute position information indicates a validated position (i.e. latitude, longitude, altitude, etc.) in a scale (i.e. coordinate system). The absolute position information is transmitted on a regular basis from a transmitter installed on a ceiling, a pathway, etc.

A position P'1 represents a position which is corrected, upon receiving the absolute position information at the receiving area AREA1, using parametric statistics (e.g. Kalman filtering). A position P'2 represents a position which is corrected, upon receiving the absolute position information at the receiving area AREA2, using the parametric statistics. Circles E1 and E2 indicate estimates (i.e. error information) of estimation errors obtained in parametric statistics.

Here is an example where a person carrying an inertial device walks from the receiving area AREA1 to the receiving area AREA2. A position of the person is corrected to the position P'1 upon entering the receiving area AREA1, which is regarded as a basepoint. At the time when the person arrives at the receiving area AREA2, there is a large gap between a position 1001 with a trajectory 1012 estimated solely by the PDR system and the absolute position P2. The gap is caused by an estimation error with regard to a distance and a direction. That is to say, in a case where a traveling velocity parameter for estimating traveling velocity is not proper or where a direction estimated by the inertial device has an error, the position 1001 estimated solely by the PDR system is apart from the position P'2 after being corrected by use of parametric statistics. In FIG. 1, a directional estimation error (i.e. yaw angle correcting value) $\Delta\psi$ and a distance estimation error $\Delta L$ are illustrated.

The estimation errors are caused by an improper traveling velocity estimating parameter for estimating traveling velocity of the person, with which an error is superimposed on the calculated position 1001, and also caused by not correcting the direction (i.e. yaw angle) estimated by the inertial device. Therefore, it is desired to correct the estimation errors more properly so that an inertial device performs more accurate position estimation.

<Summary of a Positioning Method Performed by an Inertial Device>

Next, a summary of a positioning method performed by an inertial device according to the embodiment of the present invention will be described. In the positioning method according to the embodiment of the present invention, a positioning result of a PDR system (which at least includes position coordinates, and may include error information in a case where parametric statistics is employed in the PDR system) is corrected, upon receiving absolute position information, by use of parametric statistics based on the absolute position information, so as to estimate an error (i.e. E1 and E2 in FIG. 1) with respect to the position coordinates.

The position coordinates estimated solely by the inertial device are reset based on the corrected position coordinates and the error. Then, in a case where a later-described "conditions for correction" is met, following processes are executed.

1. Calculating a distance A and a traveling direction (i.e. a first direction, which is formed by a line of the distance A) between newly corrected position coordinates (i.e. P'2) and lastly corrected position coordinates (i.e. P'1)
2. Calculating a distance B and a traveling direction (i.e. a second direction, which is formed by a line of the distance B) between the lastly corrected position coordinates (i.e. P'1) and the position 1001 which is estimated solely by the inertial device
3. Utilizing a calculation result of dividing the distance A by the distance B as a traveling velocity estimating parameter for subsequent position estimation performed in the PDR system
4. Correcting a posture of the inertial device by use of a yaw angle correcting value (i.e. direction correcting parameter), which is a gap between the first direction and the second direction By use of such a positioning method, the inertial device is capable of performing accurate position estimation, as the inertial device calculates a walking speed correcting parameter and a direction correcting parameter in parametric statistics, and then performs subsequent positioning operations in the PDR system using a corrected traveling direction and a corrected walking speed.

Here, parametric statistics refers to statistics for performing estimation based on an assumption as to a parameter for defining characteristics of a population. For example, a true value or an error may be estimated based on an assumption as to normality and homoscedasticity regarding a population. In contrast, non-parametric statistics refers to statistics for estimating a true value or an error with no assumption as to a distribution form (i.e. parameter) regarding a population. In the embodiment of the present invention, a Kalman filter is employed as an example of parametric statistics.

<Summery of the Inertial Device>

Figure 2B:
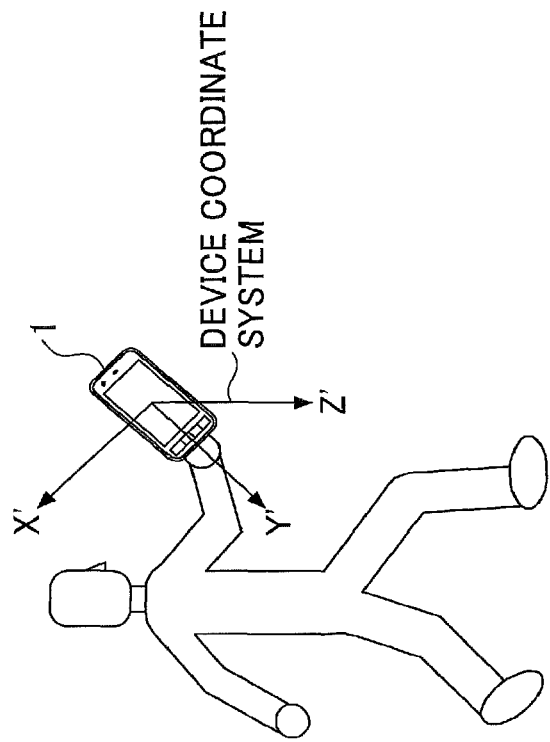
FIGS. 2A and 2B are drawings illustrating examples of coordinate systems relating to an inertial device, according to the embodiment.
Figure 2A:
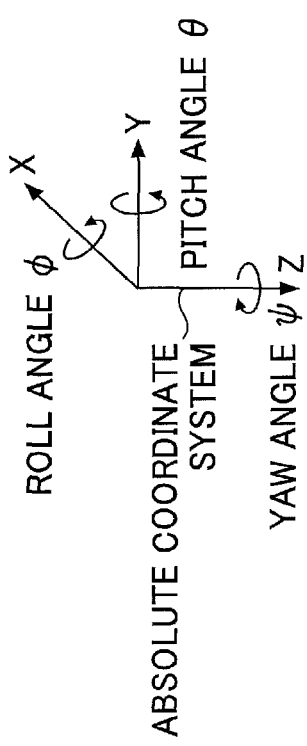

FIGS. 2A and 2B are drawings illustrating examples of coordinate systems relating to an inertial device 1. FIG. 2A is a later-described absolute coordinate system, whereas FIG. 2B is a device coordinate system which is fixed with respect to the inertial device 1. In the following description, a horizontal plane for a user to walk on is expressed by X-axis and Y-axis, and the vertical direction orthogonal to X-axis and Y-axis is expressed as Z-axis. X-axis and Y-axis are orthogonal. Furthermore, the device coordinate system is expressed by X'-axis, Y'-axis, and Z'-axis.

The inertial device 1, also referred to as an information processing apparatus, may be a compact portable device such as a so-called smart device, a mobile phone, a tablet device, a wearable personal computer (PC), a personal digital assistant (PDA), and a laptop PC. The inertial device 1 is provided with inertial sensors (i.e. a three-axis acceleration sensor and a three-axis angular velocity sensor) and a three-axis geomagnetic sensor, which may be mounted on a smartphone, etc., available on the market. The inertial device 1 is capable of detecting changes in acceleration, angular velocity, and directions, by use of the respective sensors. The geomagnetic sensor detects an azimuth direction in a form of an absolute value, based on geomagnetic field. The acceleration sensor detects changes in acceleration. The angular velocity sensor detects changes in angular velocity. Furthermore, an inertial sensor is a collective term that refers to sensors which detect changes relating to inertia and output signals that correspond to amounts of the respective changes.

Here, the inertial device 1 may be a device other than the above-described devices, such as a music player, an activity tracker, and a wristwatch. Further, the inertial device 1 may be built into another device such as a walking robot and a collar for animals. In such a way, it is possible to estimate a traveling direction of a variety of people and objects that moves in a vertical direction in a steady cycle.

<Hardware Configuration>

Figure 3:
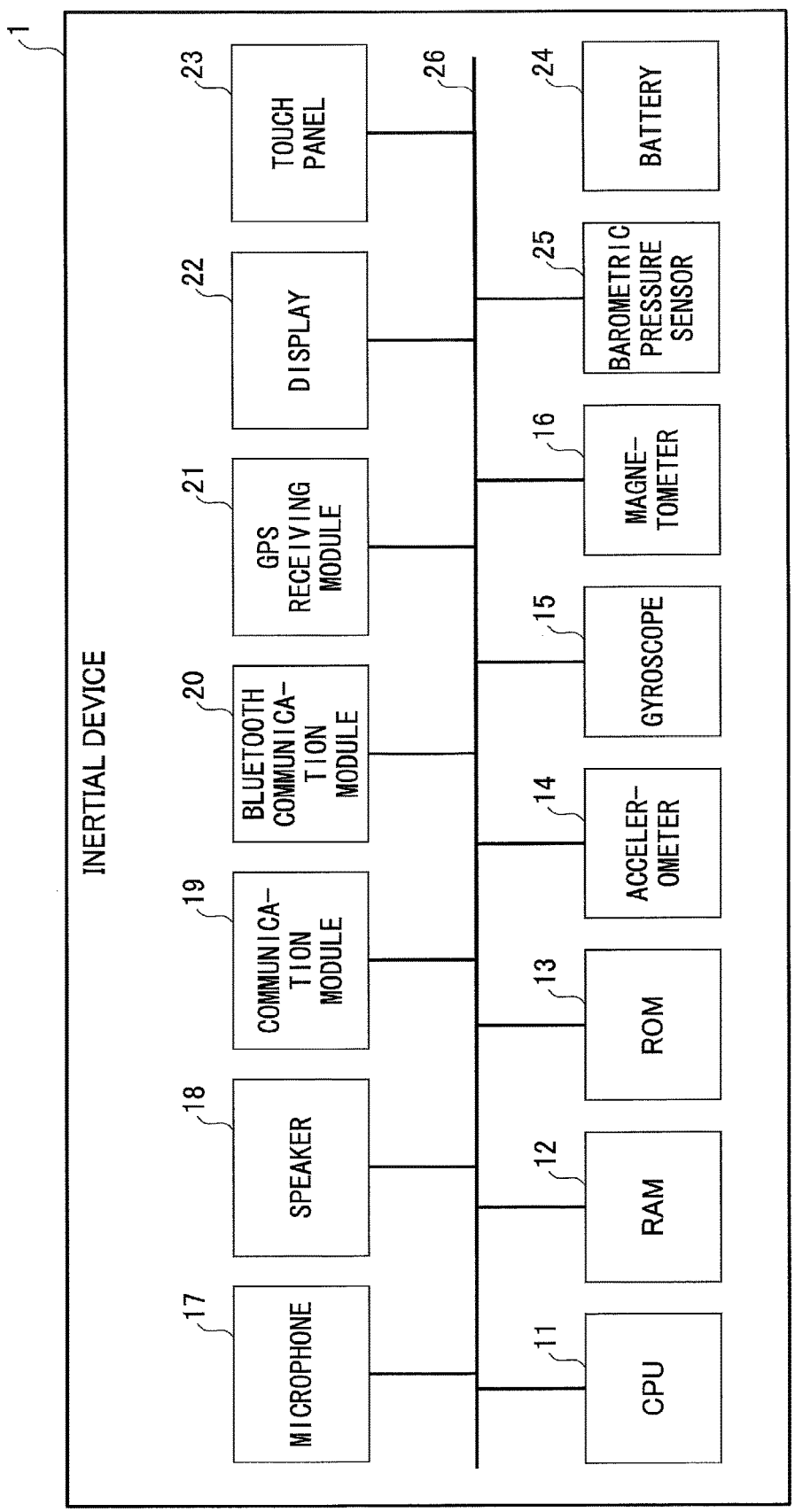
FIG. 3 is a drawing illustrating an example of a hardware configuration of the inertial device, according to the embodiment.

In the following, a hardware configuration of the inertial device 1 according to the embodiment of the present invention will be described, with reference to FIG. 3. FIG. 3 is a drawing illustrating an example of a hardware configuration of the inertial device, in a case where the inertial device 1 is a smart device such as a smartphone.

The inertial device 1 includes a central processing unit (CPU) 11, a random access memory (RAM) 12, a read-only memory (ROM) 13, an accelerometer 14, a gyroscope 15, a magnetometer 16, a microphone 17, a speaker 18, a communication module 19, a Bluetooth (registered trademark) communication module 20, a global positioning system (GPS) receiving module 21, a display 22, a touch panel 23, a battery 24, a barometric pressure sensor 25, and a bus 26.

The CPU 11 executes programs for controlling operation of the inertial device 1. The RAM 12 provides a work area for the CPU 11, etc. The ROM 13 stores programs to be executed by the CPU 11 and data necessary for execution of the programs. The accelerometer 14 detects acceleration, as an output of a sensor, in X', Y', and Z'-axis directions of a device coordinate system of the inertial device 1. The gyroscope 15 (or gyro sensor) detects angular velocity, as an output of a sensor, in X', Y', and Z'-axis directions of the device coordinate system of the inertial device 1. The magnetometer 16 outputs three dimensional vectors indicative of magnetic north, as an output of a sensor, in order to detect an orientation of the inertial device 1. The barometric pressure sensor 25 measures barometric pressure, in order to detect an altitude of the inertial device 1.

The microphone 17 converts sound such as voice of a user into an electronic signal. The speaker 18 outputs sound based on an electronic signal. The communication module 19 is a unit for communicating with other devices which are connected to a 3G network and/or a wireless local area network (LAN). The Bluetooth communication module 20 is a unit for communication by use of Bluetooth. The GPS receiving module 21 is a unit for receiving a positioning signal which is transmitted from a GPS satellite or an indoor messaging system (IMES).

The display 22 is a unit for displaying a screen for a user. The touch panel 23 is a unit for receiving input from a user. The battery 24 is a unit for providing electricity for driving the inertial device 1. The bus 26 interconnects the above-described units, except for the battery 24.

Here, the microphone 17, the speaker 18, the communication module 19, the Bluetooth communication module 20, the GPS receiving module 21, the display 22, and the touch panel 23 are optional parts. For example, the above parts are not necessary in a case where the inertial device 1 is such a device as an activity tracker, etc., which does not include a display screen.

Furthermore, the inertial device 1 may be provided with a unit for wireless communication in accordance with another standard (e.g. ZigBee (registered trademark) communication module), instead of the Bluetooth communication module 20.

<Overall Configuration of the Inertial Device>

Figure 4:
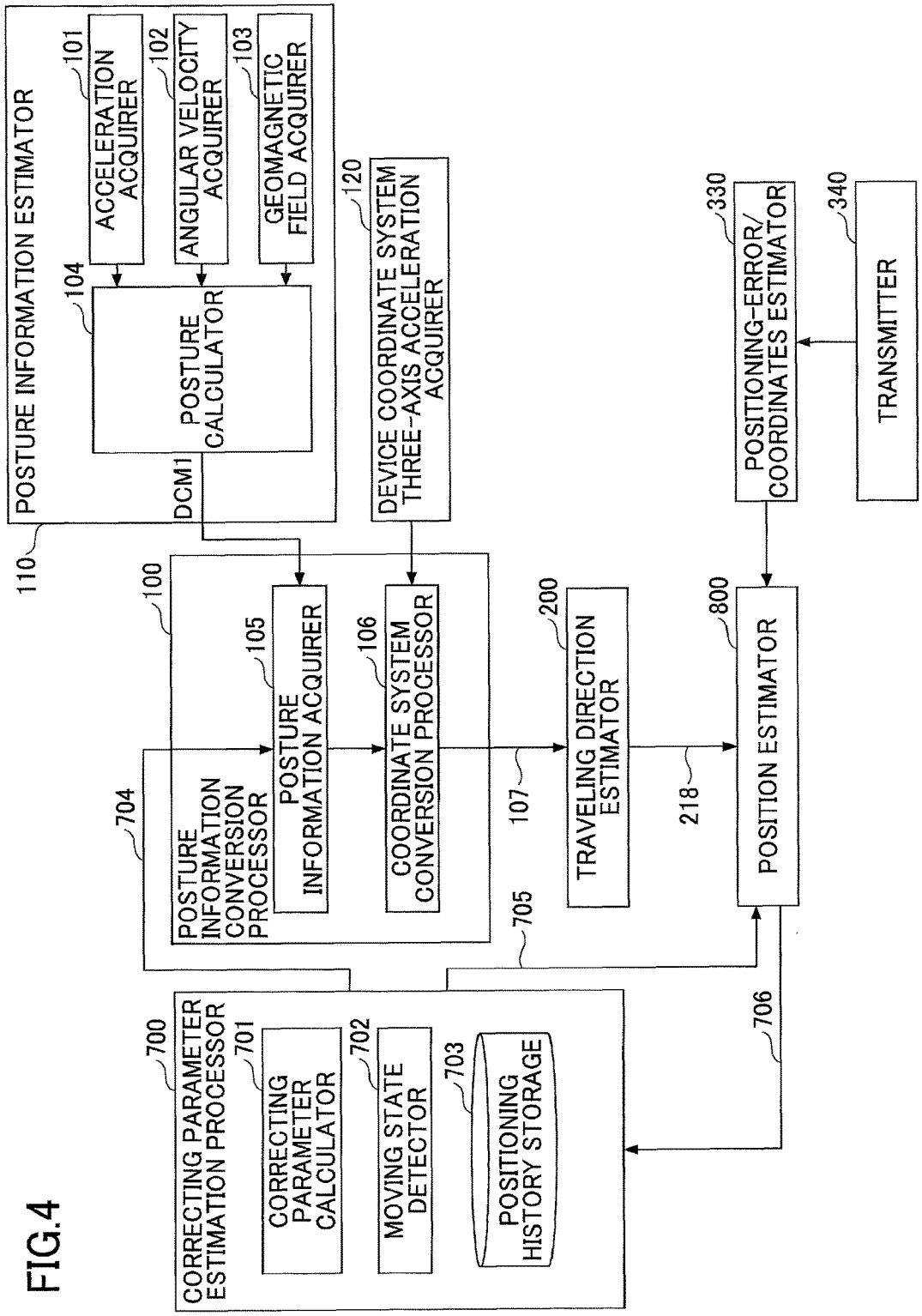
FIG. 4 is a functional block diagram illustrating an example of the inertial device 1, according to the embodiment.

FIG. 4 is a functional block diagram illustrating an example of the inertial device 1. The inertial device 1 includes a posture information conversion processor 100, a traveling direction estimator 200, a correcting parameter estimation processor 700, a position estimator 800, a posture information estimator 110, a device coordinate system three-axis acceleration acquirer 120, and a positioning-error/coordinates estimator 330. Each of the units included in the inertial device 1 is a function/unit implemented when the CPU 11 illustrated in FIG. 3 executes a program decompressed from the ROM 13 to the RAM 12 and controls the corresponding parts illustrated in FIG. 3.

The correcting parameter estimation processor 700 calculates a correcting parameter (i.e. a yaw angle correcting value 704 and a walking speed correcting parameter 705). The details of the correcting parameter estimation processor 700 will be described later.

The posture information estimator 110 acquires detected values of acceleration, angular velocity, and geomagnetic field, and then generates a later-described quaternion, which includes information equivalent to a later-described direction cosine matrix, or rotation matrix DCM1. The quaternion is transmitted to the posture information conversion processor 100.

The posture information conversion processor 100 converts acceleration on the device coordinate system into acceleration on the absolute coordinate system, based on the direction cosine matrix (or rotation matrix DCM1). Further, the posture information conversion processor 100 acquires the yaw angle correcting value 704, and then corrects a traveling direction. In such a way, an absolute coordinate system acceleration vector 107 having a corrected traveling direction is transmitted to the traveling direction estimator 200.

The traveling direction estimator 200 generates a traveling direction 218 of a user, based on the absolute coordinate system acceleration vector 107 on the absolute coordinate system. The details of the traveling direction estimator 200 will be described later.

The position estimator 800 calculates a traveling velocity vector based on the traveling direction 218 estimated by the traveling direction estimator 200 and calculates a current position and error information using parametric statistics such as a Kalman filter. The current position indicates a velocity and a position obtained solely by the PDR system. Furthermore, upon receiving absolute position information, the position estimator 800 corrects the current position using parametric statistics, such as a Kalman filter, and calculates error information. Here, a current position correcting flag is turned to be TRUE. The current position, the error information, and the current position correcting flag (706) are transmitted to the correcting parameter estimation processor 700.

Furthermore, the position estimator 800 acquires the walking speed correcting parameter 705 from the correcting parameter estimation processor 700, and then corrects a traveling velocity vector.

The device coordinate system three-axis acceleration acquirer 120 acquires acceleration in the three axes of the device coordinate system from the accelerometer 14. The acceleration in the three axes of the device coordinate system is transmitted to a coordinate system conversion processor 106.

The positioning-error/coordinates estimator 330 acquires absolute position information (which is provided for correcting a position, and therefore may be also referred to as position correcting information) from a transmitter 340, and then extracts an absolute position and estimates a positioning error. The positioning error and the absolute position are transmitted to the position estimator 800.

<<Posture Information Estimator>>

Functions of the posture information estimator 110 will be described. The posture information estimator 110 includes an acceleration acquirer 101, an angular velocity acquirer 102, a geomagnetic field acquirer 103, and a posture calculator 104. The posture information estimator 110 outputs the rotation matrix DCM1 (or direction cosine matrix/quaternion) which is indicative of a posture of the inertial device 1.

Here, the absolute coordinate system is a standardized coordinate system for uniformly dealing with coordinate values observed by multiple types of sensors, as exemplified by a latitude-longitude coordinate system such as the World Geodetic System (WGS) 84 used for the GPS and by an orthogonal coordinate system such as the Universal Transverse Mercator (UTM). The absolute coordinate system is also referred to as the World Coordinate System. Further, the device coordinate system is also referred to as a body coordinate system, on which a point on the inertial device 1 is defined as the origin and three axes which are mutually orthogonal to each other at the origin are respectively defined as X', Y', and Z'-axis.

The acceleration acquirer 101 acquires changes in acceleration of the three axes detected by the accelerometer 14. The angular velocity acquirer 102 acquires changes in angular velocities of the three axes detected by the gyroscope 15. Similarly to the acceleration, the angular velocities acquired by the gyroscope 15 are fixed with respect to the device coordinate system. The geomagnetic field acquirer 103 acquires three dimensional geomagnetic vectors indicative of magnetic north, which are detected by the magnetometer 16, and then acquires information indicative of an orientation of the inertial device 1. Similarly to the acceleration, the orientation acquired by the magnetometer 16 is fixed with respect to the device coordinate system.

The posture calculator 104 calculates a current posture of the inertial device 1, based on above-described sensor information acquired by the acceleration acquirer 101, the angular velocity acquirer 102, and the geomagnetic field acquirer 103, and then performs an inverse matrix calculation, based on the information (i.e. rotation matrix) with respect to the posture, in order to obtain an inverse rotation matrix. The obtained inverse rotation matrix is the later-described rotation matrix DCM1.

The posture calculator 104 calculates a matrix which is indicative of a posture of the inertial device 1 and outputs an inverse of the matrix, using an extended Kalman filter (see, Welch, Greg. and Gary Bishop, "An Introduction to the Kalman Filter", Jul. 24, 2006, Department of Computer Science, University of North Carolina at Chapel Hill; Katayama, Toru. "Shinban ouyou Kalman filter", Jan. 20, 2000, Asakura Shoten; and FIGS. 38 through 40). In the following, the detail of the above process will be described.

(((General Expression of an Extended Kalman Filter))

Figure 38:
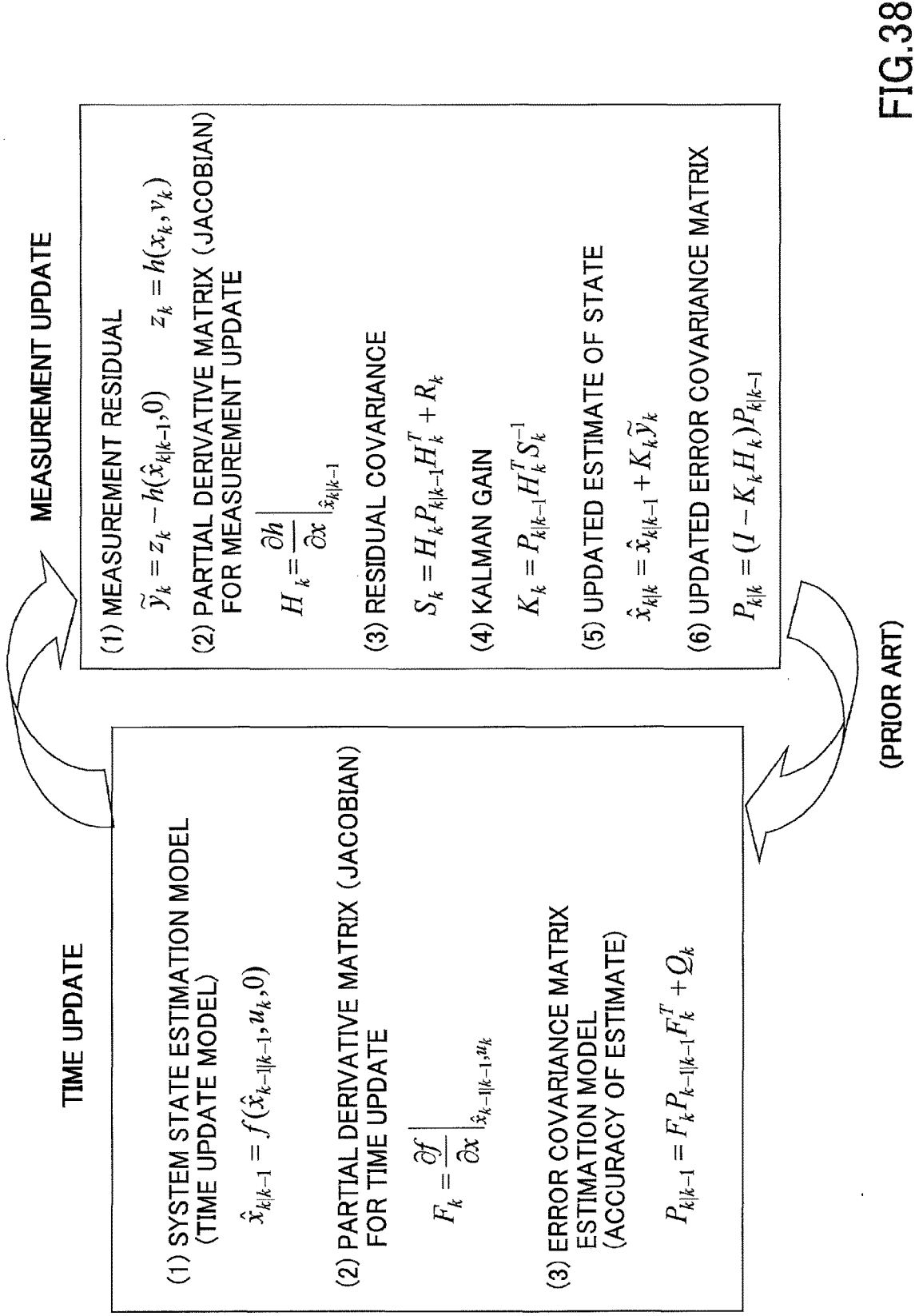
FIG. 38 is a drawing illustrating a general expression of an extended Kalman filter, according to prior art.

FIG. 38 is a drawing illustrating a general expression of an extended Kalman filter. In Kalman filtering, time-updating and measurement-updating procedures are executed in a time step. In the time-updating procedure, an estimate of a state at the present time is calculated based on a state at a previous time. In the measurement-updating procedure, the estimate is corrected based on a measurement at the present time, so as to perform more accurate estimation of the state. The procedures are executed repeatedly, in order to obtain optimal state variables.

FIG. 39 is a drawing illustrating variables used in the time-updating procedure of the extended Kalman filter. Each of the variables corresponding to expressions (1) through (3) included in the field "TIME UPDATE" illustrated in FIG. 38 is explained. Here, "k" indicates a discrete time step, and "k−1" indicates a previous time step.

FIG. 40 is a drawing illustrating variables used in the measurement-updating procedure of the extended Kalman filter. Each of the variables corresponding to expressions (1) through (6) included in the field "MEASUREMENT UPDATE" illustrated in FIG. 38 is explained.

((Application of the Extended Kalman Filter))

The posture calculator 104 performs the time-updating procedure of the extended Kalman filter for updating posture information which is output from the gyroscope 15 (i.e. roll angle, pitch angle, and yaw angle). Moreover, the posture calculator 104 performs the measurement-updating procedure of the extended Kalman filter for updating posture information which is output from the accelerometer 14 (i.e. roll angle and pitch angle) (hereinafter referred to as a first measurement-updating process). Furthermore, the posture calculator 104 performs the measurement-updating procedure of the extended Kalman filter for updating posture information which is output from the magnetometer 16 (i.e. yaw angle) (hereinafter referred to as a second measurement-updating process).

In such a way, the posture calculator 104 applies the extended Kalman filter with respect to seven states. The posture calculator 104 executes the time-updating procedure and the two measurement-updating procedures repeatedly in a parallel way, in order to estimate the posture and a bias at the zero point. Here, the posture is represented by a quaternion (hereinafter referred to as a quaternion vector) as described below.

$$q = \begin{bmatrix} w \\ x \\ y \\ z \end{bmatrix} = \begin{bmatrix} q_0 \\ q_1 \\ q_2 \\ q_3 \end{bmatrix} \quad \text{[Formula 1]}$$

A quaternion vector consists of four variables and represents a posture of an object. A representation of a posture by use of a roll angle, a pitch angle, and a yaw angle has a problem with respect to a singularity as known as a gimbal lock, whereas a quaternion is capable of representing any postures with no singularities. The bias at the zero point is represented by use of three variables ($bx_k$, $by_k$, $bz_k$) corresponding to three axes, respectively (b is a constant).

In the following, the above-mentioned three expressions (1) through (3) will be explained.

((Time Update Procedure))

First, the time-updating procedure in the extended Kalman filter will be explained, with reference to FIGS. 5 through 7. In the procedure, the posture calculator 104 enters output values from the gyroscope 15 to a later-described state estimation model as an input, so as to perform time integration in accordance with the time-updating procedure of the extended Kalman filter. In such a way, an updated quaternion vector q and an error covariance matrix P are obtained (i.e. roll angle, pitch angle, and yaw angle).

FIG. 5 is a drawing for explaining items included in (1) a system state estimation model of the general expression of the extended Kalman filter according to the embodiment of the present invention. Here, an estimate of the state at the present time is defined as expressed by an expression (1)-1 in FIG. 5, using the above-described quaternion vector and the bias at the zero point.

$$x_{k|k-1} = [w_k\ x_k\ y_k\ z_k\ bx_k\ by_k\ bz_k]^T \quad \text{[Formula 2]}$$

Furthermore, an input value $u_k$ is defined as expressed in an expression (1)-4 in FIG. 5, using the output values from the gyroscope 15 ($\omega_{0xk}$, $\omega_{0yk}$, $\omega_{0zk}$) (rad/sec) (b is a constant).

$$u_k = \begin{bmatrix} \omega_{xk} \\ \omega_{yk} \\ \omega_{zk} \end{bmatrix} = \begin{bmatrix} \omega_{0xk} - bx_k \\ \omega_{0yk} - by_k \\ \omega_{0zk} - bz_k \end{bmatrix} \quad \text{[Formula 3]}$$

Here, the output values ($\omega_{0xk}$, $\omega_{0yk}$, $\omega_{0zk}$) indicate angular velocity (rad/sec) without offsets, as values at the zero point are subtracted. The system state estimation model is defined as expressed by an expression (1)-5 in FIG. 5. Here, $C_1$, $C_2$, and $C_3$ are arbitrary constants.

$$\begin{bmatrix} w_k \\ x_k \\ y_k \\ z_k \\ bx_k \\ by_k \\ bz_k \end{bmatrix} = \frac{1}{2} \begin{bmatrix} 2 & -\omega_x t & -\omega_y t & -\omega_z t & 0 & 0 & 0 \\ \omega_x t & 2 & -\omega_z t & \omega_y t & 0 & 0 & 0 \\ \omega_y t & \omega_z t & 2 & -\omega_x t & 0 & 0 & 0 \\ \omega_z t & \omega_y t & \omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix} \begin{bmatrix} w_{k-1} \\ x_{k-1} \\ y_{k-1} \\ z_{k-1} \\ bx_{k-1} \\ by_{k-1} \\ bz_{k-1} \end{bmatrix} \quad \text{[Formula 4]}$$

FIG. 6 is a drawing for explaining (2) a partial derivative matrix (i.e. Jacobian) in the time-updating procedure of the general expression of the extended Kalman filter, according to the embodiment of the present invention. As explained in FIG. 5, the system state estimation model is defined as expressed by the expression (1)-5 in FIG. 5. As the right side member of the expression (1)-5 is "f", the partial derivative matrix with regard to the time-updating procedure is obtained based on partial derivative of the right side member.

FIG. 7 is a drawing for explaining (3) an error covariance matrix $P_{k|k-1}$ of the general expression of the extended Kalman filter, according to the embodiment of the present invention. A process noise $Q_k$ is a constant that is determined preliminarily in a system identification process.

$$Q_k = \begin{bmatrix} q_{wk} & 0 & 0 & 0 & 0 & 0 & 0 \\ 0 & q_{xk} & 0 & 0 & 0 & 0 & 0 \\ 0 & 0 & q_{yk} & 0 & 0 & 0 & 0 \\ 0 & 0 & 0 & q_{zk} & 0 & 0 & 0 \\ 0 & 0 & 0 & 0 & q_{bxk} & 0 & 0 \\ 0 & 0 & 0 & 0 & 0 & q_{byk} & 0 \\ 0 & 0 & 0 & 0 & 0 & 0 & q_{bzk} \end{bmatrix} \quad \text{[Formula 5]}$$

The error covariance matrix $P_{k|k-1}$ at the present time may be obtained based on the process noise $Q_k$, the error covariance matrix $P_{k-1|k-1}$ at the previous step, the partial derivative matrix (i.e. Jacobian) $F_k$ and a transposed matrix $F_k^T$ thereof with regard to the time-updating procedure (as expressed by the expression (3)-5 in FIG. 7). Here, the error covariance matrixes $P_{k|k-1}$ and $P_{k-1|k-1}$ form 7 by 7 matrixes, in which each element is a real number.

The posture calculator 104 executes the time-updating procedure of the extended Kalman filter by use of the above-described models and definitions of the variables, in order to calculate the posture of the inertial device 1 in the absolute coordinate system and calculate an inverse matrix (i.e. inverse rotation matrix) of a matrix indicative of the posture.

((First Measurement-Updating Procedure))

Next, the first measurement-updating procedure of the extended Kalman filter will be explained, with reference to FIG. 8. In the procedure, the posture calculator 104 compares angular information in the horizontal directions which is obtained from the acceleration acquirer 101 with angular information in the horizontal directions which is obtained from a current quaternion vector, in order to correct the difference between the information (with respect to the roll angle and the pitch angle only).

FIG. 8 is a drawing for explaining items included in (1) a measurement residual in the general expression of the extended Kalman filter.

$$\tilde{y}_k \quad \text{[Formula 6]}$$

First, a measurement (vector) h at a previous step is expressed by an expression (1)-3 in FIG. 8.

$$h = \begin{bmatrix} 2x_k z_k - 2w_k y_k \\ 2y_k z_k + 2w_k x_k \\ 1 - 2(x_k x_k + y_k y_k) \end{bmatrix} \quad \text{[Formula 7]}$$

Elements included in the above expression derive from a three dimensional rotation matrix (4 by 4) which are determined preliminarily. Furthermore, a measurement (vector) $z_k$ is expressed by an expression (1)-2 in FIG. 8.

$$z_k = \frac{1}{\sqrt{a_x a_x + a_y a_y + a_z a_z}} \begin{bmatrix} a_x \\ a_y \\ a_z \end{bmatrix} \quad \text{[Formula 8]}$$

Here, values ($a_x$, $a_y$, $a_z$) are output values from the accelerometer 14, which are obtained by the acceleration acquirer 101. The measurement residual may be calculated based on the measurement (vector) h and the measurement (vector) $z_k$ described above.

$$\tilde{y}_k \quad \text{[Formula 9]}$$

Further, (2) a partial derivative matrix (i.e. Jacobian) $H_k$ in the measurement-updating procedure of the general expression of the extended Kalman filter may be obtained by calculating a partial derivative of the measurement h as expressed by an expression (1)-3 in FIG. 8.

Further, (3) a residual covariance $S_k$ in the measurement-updating procedure of the general expression of the extended Kalman filter may be obtained by use of a following measurement noise (matrix) $R_k$, the partial derivative matrix $H_k$ of the measurement-update procedure, a transposed matrix $H_k^T$ of the partial derivative matrix $H_k$, and the error covariance matrix $P_{k|k-1}$ at the present time.

$$R_k = \begin{bmatrix} r_1 & 0 & 0 \\ 0 & r_2 & 0 \\ 0 & 0 & r_3 \end{bmatrix} \quad \text{[Formula 10]}$$

Here, values ($r_1$, $r_2$, $r_3$) are variances which are preliminarily determined based on a device evaluation of the accelerometer 14.

Further, (4) a Kalman gain $K_k$ in the general expression of the extended Kalman filter may be obtained by use of the error covariance matrix $P_{k|k-1}$ at the present time, the transposed matrix $H_k^T$ of the partial derivative matrix $H_k$ regarding the measurement-updating, and an inverse matrix $S_{k-1}$ of the residual covariance $S_k$. Here, the Kalman gain $K_k$ is a 7 by 3 matrix having elements of real numbers.

Similarly, (5) an updated estimate $x_{k|k}$ of the state and (6) an updated error covariance matrix $P_{k|k}$ in the general expression of the extended Kalman filter may be obtained by use of the above-described variables.

In the measurement-updating procedure of the extended Kaman filter using the above-described models and variables, the posture calculator 104 compares angular information in the horizontal directions which is obtained from the acceleration acquirer 101 with angular information in the horizontal directions which is obtained from a current quaternion vector, in order to correct the difference between the information (with respect to the roll angle and the pitch angle only).

((Second Measurement-Updating Procedure))

Next, the second measurement-updating procedure of the extended Kalman filter will be explained, with reference to FIG. 9. In the procedure, the posture calculator 104 corrects a yaw angle component of a quaternion vector by use of yaw angle information calculated from posture information obtained in accordance with a TRIAD algorithm. A method for calculation in accordance with the TRIAD algorithm will be described later.

FIG. 9 is a drawing for explaining items included in (1) the measurement residual in the general expression of the extended Kalman filter, similarly to FIG. 8.

$$\tilde{y}_k \quad \text{[Formula 11]}$$

Similarly to FIG. 8, the measurement (vector) h in the previous time step si expressed by an expression (1)-3 illustrated in FIG. 9. On the other hand, it is uncommon with FIG. 8 that the measurement (vector) $z_k$ is expressed by an expression (1)-2 illustrated in FIG. 9.

$$z_k = \begin{bmatrix} TRIAD_x \\ TRIAD_y \\ TRIAD_z \end{bmatrix} \quad \text{[Formula 12]}$$

The above vector indicates a yaw angle direction vector, which is calculated based on the TRIAD algorithm.

Further, similarly to the first measurement-updating procedure, (2) the partial derivative matrix (i.e. Jacobian) $H_k$ in the measurement-updating procedure of the general expression of the extended Kalman filter may be obtained by calculating a partial derivative of the measurement h in the previous step.

Further, (3) the residual covariance $S_k$ in the measurement-updating procedure of the general expression of the extended Kalman filter may be obtained by use of a following measurement noise (matrix) $R_k$, the partial derivative matrix $H_k$ of the measurement-update procedure, the transposed matrix $H_k^T$ of the partial derivative matrix $H_k$, and the error covariance matrix $P_{k|k-1}$ at the present time.

$$R_k = \begin{bmatrix} T_1 & 0 & 0 \\ 0 & T_2 & 0 \\ 0 & 0 & T_3 \end{bmatrix} \quad \text{[Formula 13]}$$

Here, values ($T_1$, $T_2$ $T_3$) are variances which are preliminarily determined based on a device evaluation of the magnetometer 16.

Further, (4) the Kalman gain $K_k$, (5) the updated estimate $x_{k|k}$ of the state, and (6) the updated error covariance matrix $P_{k|k}$ in the general expression of the extended Kalman filter may be obtained similarly to the first measurement-updating procedure.

<<Calculation of the Posture Information Based on the TRIAD Algorithm>>

Here, an example of calculation of the second posture information based on the TRIAD algorithm, which is performed by the posture calculator 104, will be explained with reference to FIG. 10.

Figure 10:
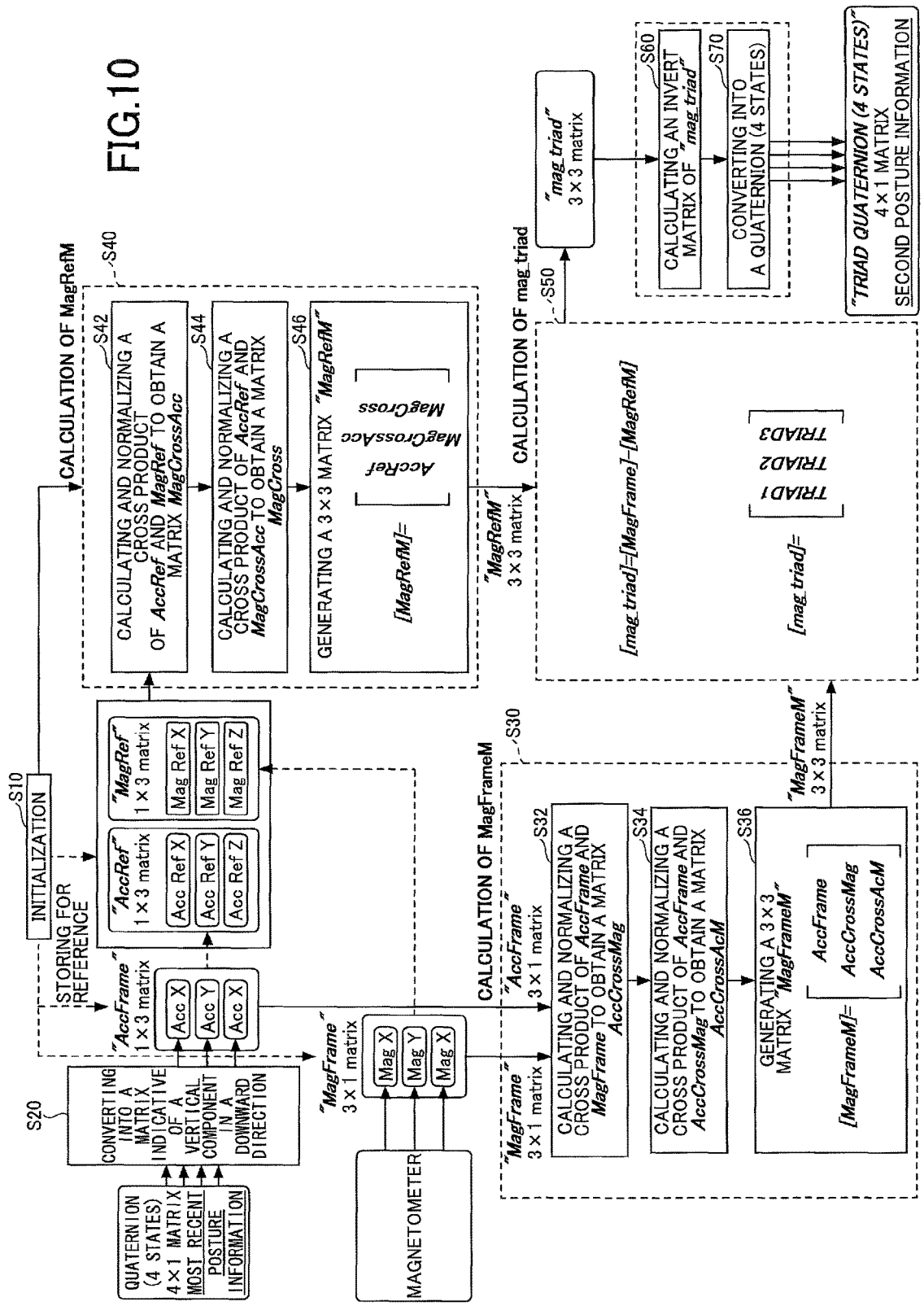
FIG. 10 is a flowchart illustrating an example of a procedure of calculating second posture information in accordance with a TRIAD algorithm performed by a posture calculator, according to the embodiment.

In step S10 of FIG. 10, before factory shipment or at the time a user performs a setting, an initialization process is executed, so that reference vectors (i.e. a vector indicative of acceleration of a vertical component in a downward direction and a geomagnetic vector) are stored as "AccRef" and "MagRef". Here, the vector indicative of acceleration of the vertical component in the downward direction may be converted from a quaternion, as described in step S20 below. The geomagnetic vector, which is input from the magnetometer 16, indicates the magnetic north. As the steps are performed only before factory shipment or at the time of performing setting by a user, etc., the reference vectors retains the same values unless an initialization process is executed.

In step S20 of FIG. 10, a quaternion (4 states) indicative of the most recent posture information of the inertial device 1 is converted into a 1 by 3 matrix "AccFrame" indicative of the vertical component in the downward direction.

In step S30 of FIG. 10, a 3 by 3 matrix "MagFrameM" is calculated by use of "AccFrame" and "MagFrame".

In step S32, a cross product of "AccFrame" and "MagFrame" is calculated, so that "AccCrossMag" is obtained through normalization.

In step S34, a cross product of "AccFrame" and "AccCrossMag" is calculated, so that "AccCrossAcM" is obtained through normalization.

In step S36, "AccFrame", "AccCrossMag" obtained in step S32, and "AccCrossAcM" obtained in step S34 (each of "AccFrame", "AccCrossMag", and "AccCrossAcM" is a 1 by 3 matrix (vector)) are combined, so that the 3 by 3 matrix "MagFrameM" is generated.

On the other hand, in step S40 of FIG. 10, a 3 by 3 matrix "MagRefM" is calculated by use of "AccRef" and "MagRef".

In step S42, a cross product of "AccRef" and "MagRef" is calculated, so that "MagCrossAcc" is obtained through normalization.

In step S44, a cross product of "AccRef" and "MagCrossAcc" is calculated, so that "MagCross" is obtained through normalization.

In step S46, "AccRef", "MagCrossAcc" obtained in step S42, and "MagCross" obtained in step S44 (each of "AccRef", "MagCrossAcc", and "MagCross" is a 1 by 3 matrix (vector)) are combined, so that the 3 by 3 matrix "MagRefM" is generated.

Here, the above-described step S40 (including steps S42 through S46) may be executed upon an initialization process, in which "AccRef" and "MagReff" are modified, and the generated value "MagRefM" may be retained until the next time an initialization process is performed.

In step S50 of FIG. 10, an inner product of "MagFrame" and "MagRefM" is calculated, so that a 3 by 3 matrix "mag_triad" is obtained. The matrix "mag_triad" is used to convert the device coordinate system into the absolute coordinate system. In the TRIAD algorithm, three columns are referred to as TRIAD1, TRIAD2, and TRIAD3, respectively.

In step S60 of FIG. 10, an invert matrix (i.e. a matrix for converting the absolute coordinate system to the device coordinate system) of "mag_triad" is calculated and converted into a quaternion. The obtained quaternion is the second posture information. Further, the invert matrix of "mag_triad" is the rotation matrix DCM1.

<Posture Information Conversion Processor>

The posture information conversion processor 100 illustrated in FIG. 4 will be explained, with reference to FIG. 11. The posture information conversion processor 100 includes a posture information acquirer 105 and a coordinate system conversion processor 106. The posture information acquirer 105 acquires the rotation matrix DCM1 from the posture information estimator 110 and acquires the yaw angle correcting value 704 from the correcting parameter estimation processor 700.

Further, the coordinate system conversion processor 106 multiplies acceleration of the device coordinate system acquired by the device coordinate system three-axis acceleration acquirer 120 by the rotation matrix DCM1, so as to calculate acceleration in the three axes of the absolute coordinate system (i.e. absolute acceleration). Furthermore, the coordinate system conversion processor 106 performs a coordinate conversion on the acceleration vectors in the three axes of the absolute coordinate system, using a rotation matrix DCM2.

Figure 11:
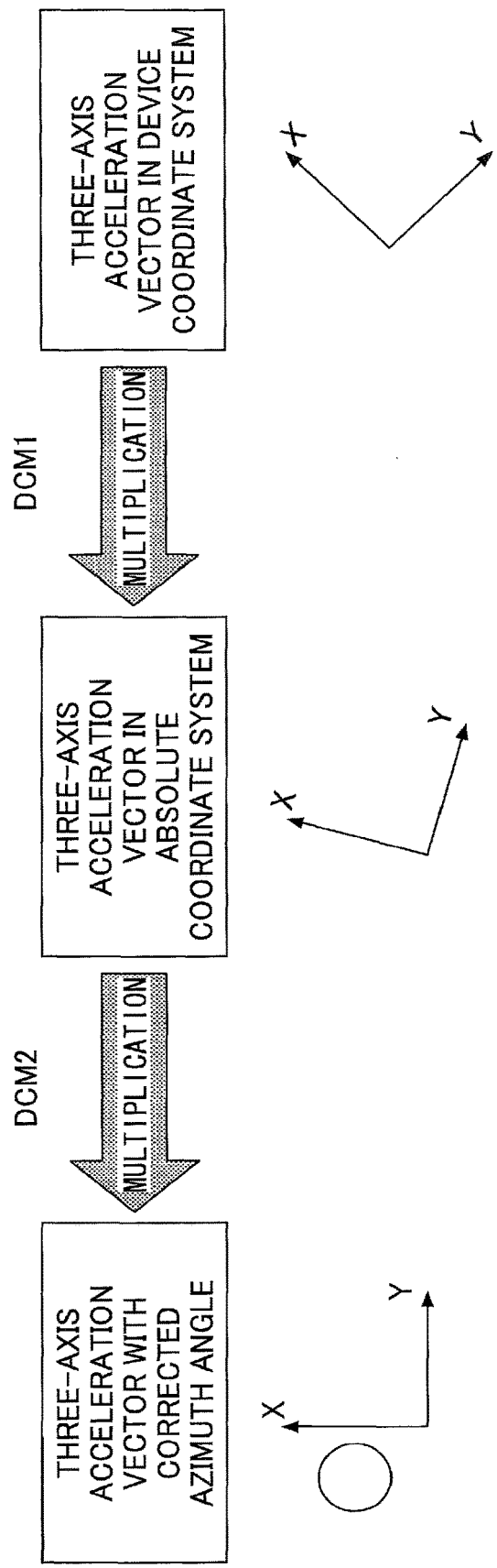
FIG. 11 is a drawing illustrating an example of a coordinate conversion, according to the embodiment.

As illustrated in FIG. 11, the coordinate system conversion processor 106 performs a coordinate conversion on the acceleration vectors in the three axes of the device coordinate system, using the rotation matrix DCM1, into the acceleration vectors in the three axes of the absolute coordinate system.

The rotation matrix DCM2 is a direction cosine matrix and each element of the rotation matrix DCM2 is referred to as a direction cosine. The rotation matrix DCM2 is a matrix for executing the coordinate conversion on the acceleration vectors in the three axes of the absolute coordinate system into the absolute coordinate system acceleration vectors 107 on which the traveling direction is corrected by use of the yaw angle correcting value 704. The rotation matrixes (i.e. rotation matrix DCM1 and rotation matrix DCM2) are both 3 by 3 matrixes.

FIG. 12 is a drawing illustrating an example of the rotation matrix DCM2. The rotation matrix DCM2 is expressed as illustrated in FIG. 12 by use of Eular angles. As illustrated in FIG. 2, a rotation angle formed around X-axis, Y-axis, and Z-axis are respectively referred to as a roll angle $\phi$, a pitch angle, and a yaw angle $\psi$.

The coordinate system conversion processor 106 assigns a value of zero (=0) to the roll angle $\varphi$ and the pitch angle $\theta$ of the rotation matrix DCM2 and assigns the yaw angle correcting value 704 (deg), which is acquired from the correcting parameter estimation processor 700, to the yaw angle ψ, in order to correct the yaw angle ψ by use of the yaw angle correcting value 704.

By performing multiplications of matrixes using the rotation matrix DCM1 and the rotation matrix DCM2, the traveling direction estimator 200 may acquire the absolute coordinate system acceleration vector 107 on which the azimuth angle of the absolute coordinate system is corrected (in other words, offsets of the azimuth angle is cancelled). A method for calculating the yaw angle correcting value 704 will be explained later, with reference to FIG. 35, etc.

<Traveling Direction Estimator>

FIG. 13 is a drawing illustrating an example of functions of the traveling direction estimator 200. The traveling direction estimator 200, which performs a function for estimating a traveling direction of the inertial device 1, includes a band-pass filter 201, a trough detector 204, trough position storage 205, movement acceleration storage 206, a horizontal component movement velocity character information manager 207, a vertical component trough movement acceleration acquirer 208, a horizontal component movement velocity character information acquirer 209, a cycle acquirer 210, a determiner 211, and a traveling direction calculator 212. The traveling direction estimator 200 calculates traveling directions per every step of a user, based on the absolute coordinate system acceleration vectors 107 obtained from the posture information conversion processor 100.

The band-pass filter 201 removes the gravity component of the absolute coordinate system acceleration vector 107 which is output by the posture information conversion processor 100. The passband is, for example, in a range of approximately one through three Hz, which is a common frequency of people walking. Here, the passband may be modified depending on frequencies with regard to walking or movement of a person observed by the inertial device 1. In the following description, an absolute acceleration without the gravity component which is output by the band-pass filter 201 is referred to as movement acceleration 202. The movement acceleration 202 is stored in the later-described movement acceleration storage 206. Further, a vertical component movement acceleration 203, which is the vertical component of the movement acceleration 202, is transmitted to the later-described trough detector 204.

The trough detector 204 observes changes (i.e. time variation) in the vertical component movement acceleration 203 of the movement acceleration 202 which is output by the band-pass filter 201, in order to detect a trough position (i.e. time/position to be at the trough) in a waveform representing the changes. The detected trough position is stored in the later-described trough position storage 205. In the following, a method for detecting the trough position will be described.

In FIG. 14, waveforms that illustrate changes in the vertical component movement acceleration 203 (i.e. Z) and the horizontal components (i.e. X, Y) of the movement acceleration 202 are described (the horizontal axis expresses time). As illustrated, each waveform has a cycle corresponding to a traveling cycle (e.g. walking cycle). Especially, compared to the horizontal components of the movement acceleration 202, the vertical component movement acceleration 203 outputs a waveform with high amplitude, which is approximately ±1 meter per second squared. A peak comes when a foot lands on the ground whereas a trough comes when a pivoting foot is passed by the other foot.

FIG. 15 is a drawing illustrating an example of movement characteristics in the vertical direction of a walking motion. In general, a walking motion includes a stance phase and a swing phase in accordance with motions of legs. A stance phase is in a period from the time when a heel of a leg lands on the ground to the time when toes of the same leg get off the ground, whereas a swing phase in a period from the time when toes of a leg get off the ground to the time when a heel of the same leg lands on the ground. Furthermore, a walking motion is characterized by a presence of a double support phase. It is generally known that a proportion of double support phases in a whole walking motion increases when the walking motion is slow, whereas the proportion decreases when the walking motion is fast. It is further known that there is no double support phase in a running condition. It is further known that an amount of up and down motion (i.e. vertical direction) and an amount of left and right motion (i.e. horizontal direction) of a body are the largest during a middle term of a stance phase (i.e. mid-stance phase).

A first half of a mid-stance phase includes a motion of a lifted leg passing a pivoting leg (i.e. a lifted leg passing just below the body trunk). Here, the body moves upwards in the vertical direction. In other words, a traveling acceleration upwards in the vertical direction is generated. On the other hand, a second half of the mid-stance phase includes a motion of a heel of the lifted leg landing on the ground. Here, the body moves downwards in the vertical direction. In other words, a traveling acceleration downwards in the vertical direction is generated.

Figure 16:
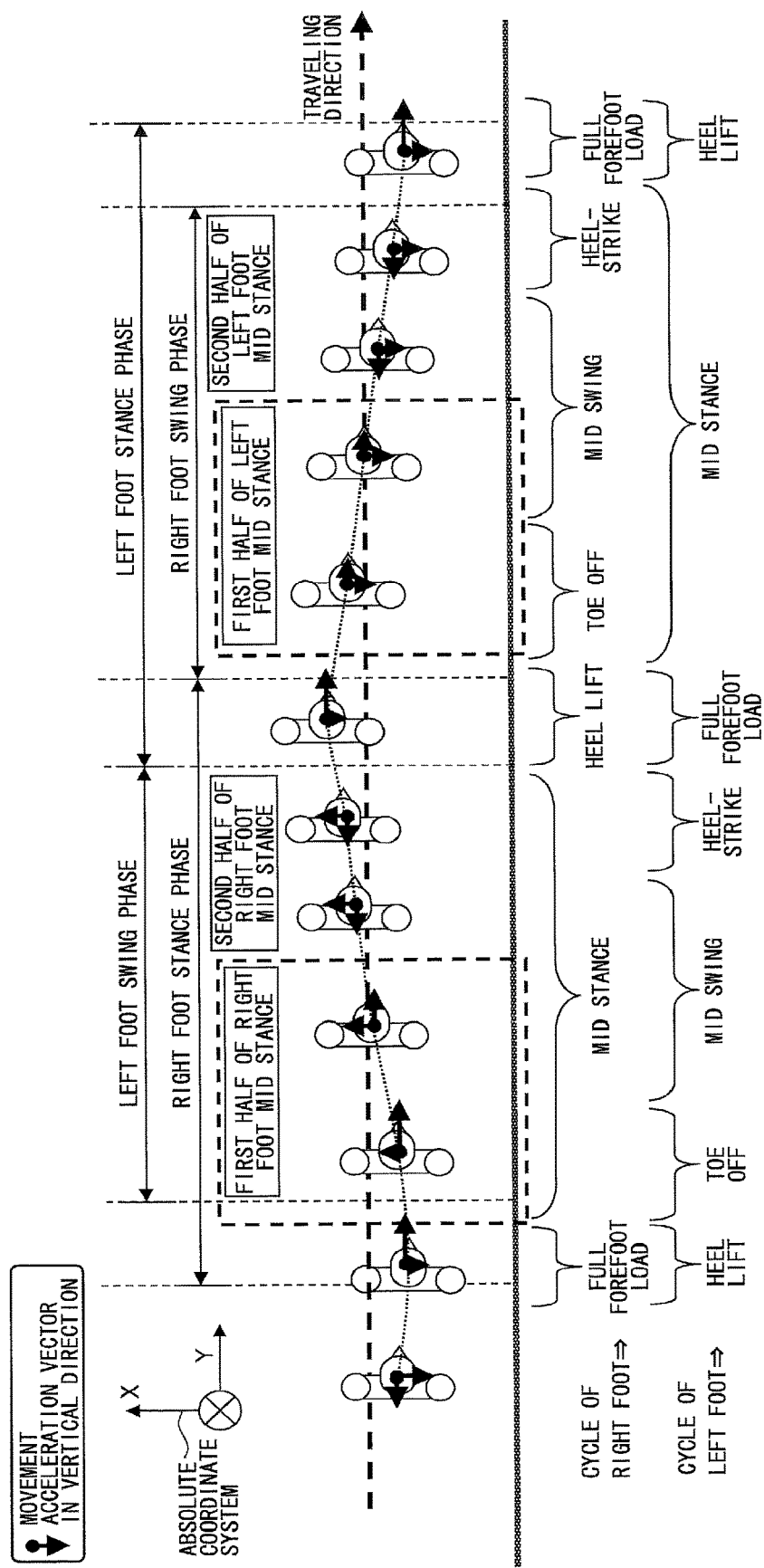
FIG. 16 is a drawing illustrating an example of movement characteristics in horizontal directions of the walking motion, according to the embodiment.

FIG. 16 is a drawing illustrating an example of movement characteristics in the horizontal directions of a walking motion. Horizontal components of the movement acceleration 202 during a first half of the mid-stance phase include acceleration generated when a leg is lifted to move the body trunk to a destination and acceleration generated due to a sway of the body weight in the sideways. On the other hand, the horizontal components of the movement acceleration 202 during a second half of the mid-stance phase include acceleration generated due to a shift of the body trunk when the lifted leg moves to the destination, acceleration generated due to a sway of the body in the sideways of a traveling direction, and acceleration generated due to vibration when a heel lands to the ground. That is to say, horizontal components of the movement acceleration 202 during the second half of the mid-stance phase do not include pure movement acceleration 202 which is necessary to step forward.

Therefore, according to the embodiment of the present invention, an estimation of a traveling direction is performed based on movement acceleration 202 during the first half of a mid-stance phase, which is largely affected by acceleration generated due to a leg lifted to move the body trunk.

Here, focusing on the vertical component movement acceleration 203, a step is detected in a way of detecting a trough by use of a threshold of a signal. Here, the reason for detecting a step based on a trough is that horizontal components of movement acceleration 202 at a peak, where a leg lands on the ground, may be affected by vibration or noise due to lading of the leg. Actual acceleration generated by a walking motion is reflected more precisely during traveling in the horizontal directions at a trough, preventing a risk of being affected by a leg lading on the ground.

The trough detector 204 detects a trough by detecting a point where the vertical component movement acceleration 203 falls below a predetermined threshold Th and a point where the vertical component movement acceleration 203 exceeds the threshold Th again. Here, the trough detector 204 determines that the trough is the point in the middle of a time to when the vertical component movement acceleration 203 falls below the predetermined threshold Th and a time tb when the vertical component movement acceleration 203 exceeds the predetermined threshold Th. The threshold Th is preferably a value which is approximately a half of movement acceleration 202 in the vertical direction of an actual walking motion. Here, other methods for detecting a trough may be employed.

Furthermore, by storing a past trough position, an interval which indicates a time between a current trough position and the past trough position may be calculated.

The trough position storage 205 stores a trough position detected by the trough detector 204. The trough position storage 205 stores trough positions (i.e. times) of the latest one and past ones by use of, for example, a ring buffer. The trough position storage 205 at least stores the latest trough position and one past trough position. The trough position storage 205 may be updated with trough positions obtained subsequently, as needed. The number of stored trough positions may be properly modified depending on the memory capacity of the inertial device 1.

The movement acceleration storage 206 adds observed time information to the movement acceleration 202 which is output by the band-pass filter 201 and stores the movement acceleration 202 as time-series data.

Responding to a detection of a trough position by the trough detector 204, the horizontal component movement velocity character information manager 207 performs integration processing on each of horizontal components (i.e. X, Y) of movement acceleration 202 generated in a predetermined period τ with the trough position in the middle, in order to calculate horizontal velocities. The horizontal velocities are referred to as horizontal component movement velocity character information. The horizontal component movement velocity character information is expressed as vectors indicative of relative values of directions and magnitudes of velocities. The horizontal component movement velocity character information manager 207 stores the horizontal component movement velocity character information together with time information t. That is to say, the horizontal component movement velocity character information manager 207 functions as a calculator which calculates horizontal component movement velocity character information and also functions as a storage which stores the horizontal component movement velocity character information.

Figure 17:
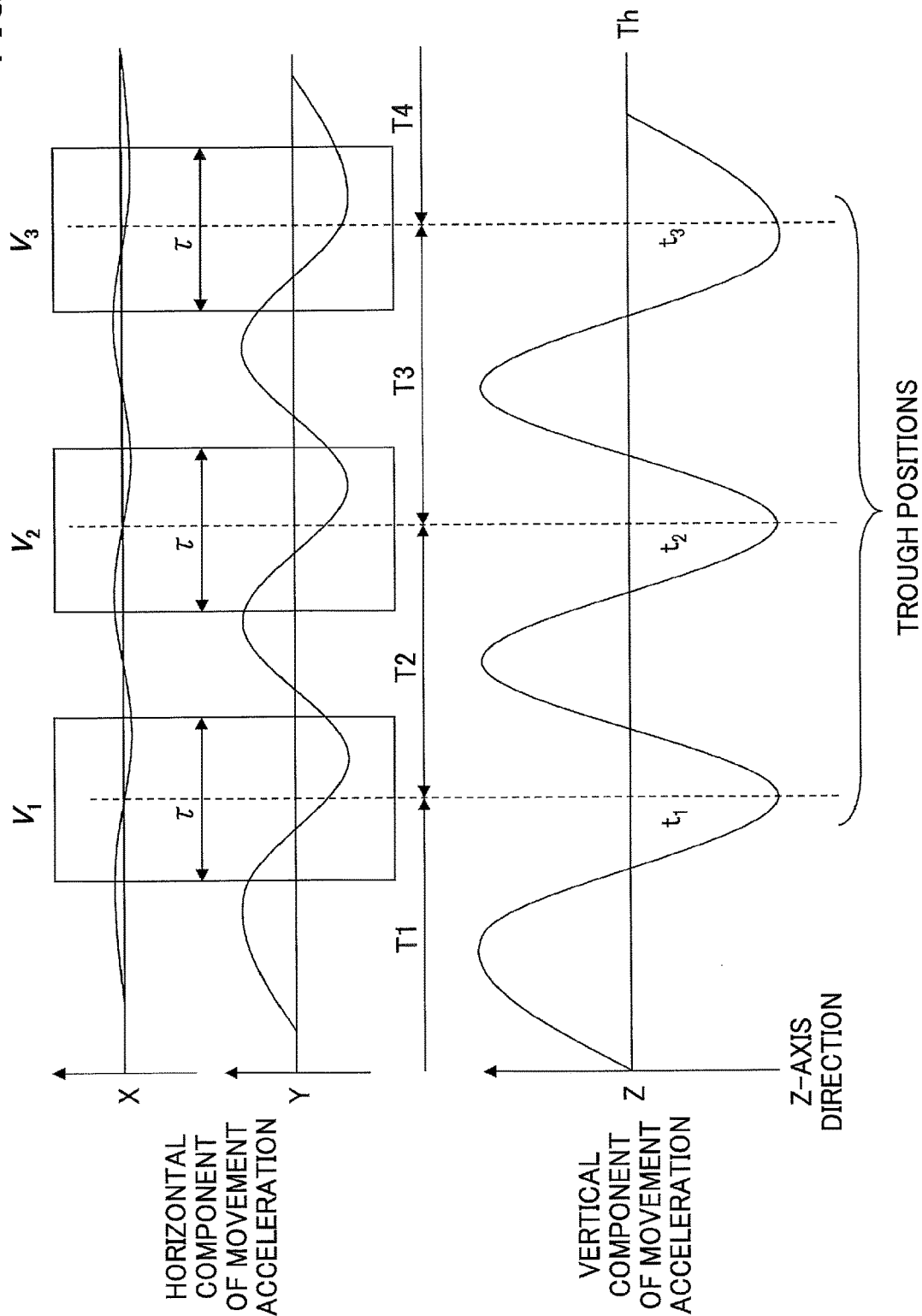
FIG. 17 is a drawing illustrating an example of waveforms illustrating changes in the vertical component (Z) and the horizontal components (X, Y) of the movement acceleration, in relation to time, according to the embodiment.

In FIG. 17, corresponding to FIG. 14, examples of waveforms that indicate changes in the movement acceleration 202 in the horizontal directions and in the vertical direction over time are illustrated. In the examples, time integration is performed on the movement acceleration 202 in the horizontal directions generated in the periods τ, in which trough positions t1, t2, and t3 obtained based on the waveform of the movement acceleration 202 in the vertical direction are respectively in the middle, in order to calculate horizontal component movement velocity character vectors $V_1$, $V_2$, and $V_3$ (also referred to as a horizontal component movement velocity character vector V, unless differentiated).

The period τ is preferably in the time period of, for example, (tb−ta). In a case where integration processing is performed on the whole time range, the integration processing is affected by acceleration generated by a body sway in the sideward direction of the traveling direction and acceleration caused by a vibration generated due to a heel landing on the ground, which may cause a faulty estimation of the traveling direction.

Figure 18:
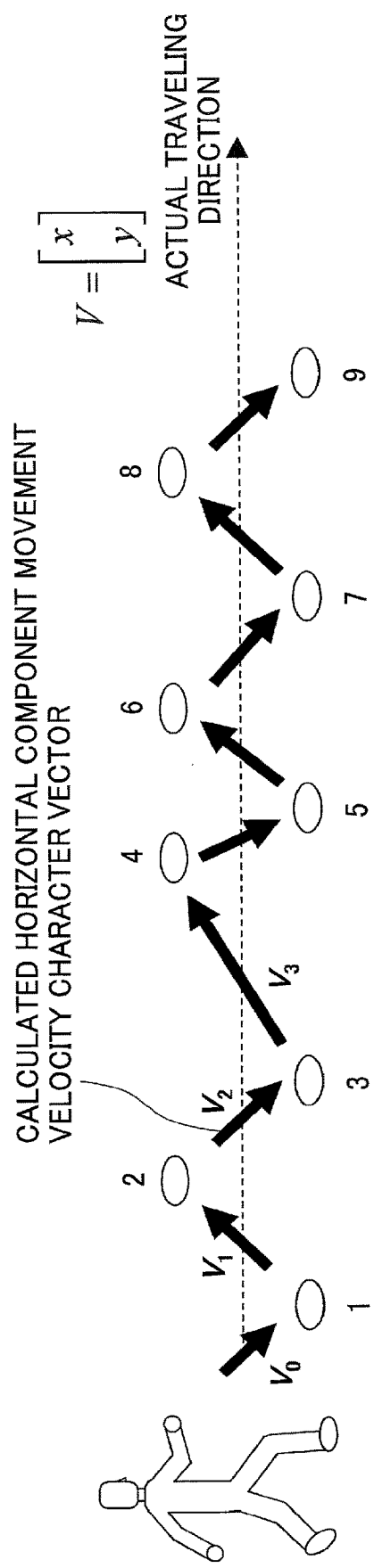
FIG. 18 is a drawing illustrating an example of a horizontal component movement velocity character vector, according to the embodiment.

The horizontal component movement velocity character information is generated in the above-described processing for detecting a trough position and other subsequent procedures, at the time when a lifted leg passes a pivoting leg. The generated character information is a horizontal component movement velocity character vector V, which are characterized by having a direction and magnitude. As illustrated in FIG. 18, the horizontal component traveling velocity characteristics vector V indicates a direction (i.e. traveling direction) and magnitude of a moving body of a pedestrian at the time when a leg passes a pivoting leg.

The vertical component trough movement acceleration acquirer 208 acquires movement acceleration of the vertical component movement acceleration 203 corresponding to the trough position (i.e. time) at the time t (i.e. vertical component trough movement acceleration), and then transmits the movement acceleration to the later-described determiner 211.

The horizontal component movement velocity character information acquirer 209 acquires the latest and past horizontal component movement velocity character information, and then transmits the horizontal component movement velocity character information to the later-described determiner 211.

The cycle acquirer 210 acquires multiple trough positions from the trough position storage 205, and then performs converting processing on the trough positions to obtain a movement cycle (e.g. walking cycle) of a person observed. Further, the cycle acquirer 210 is capable of obtaining the latest and past movement cycles by calculating differences between multiple trough positions in order. The cycle acquirer 210 transmits the obtained multiple movement cycles to the later-described determiner 211.

Figure 19:
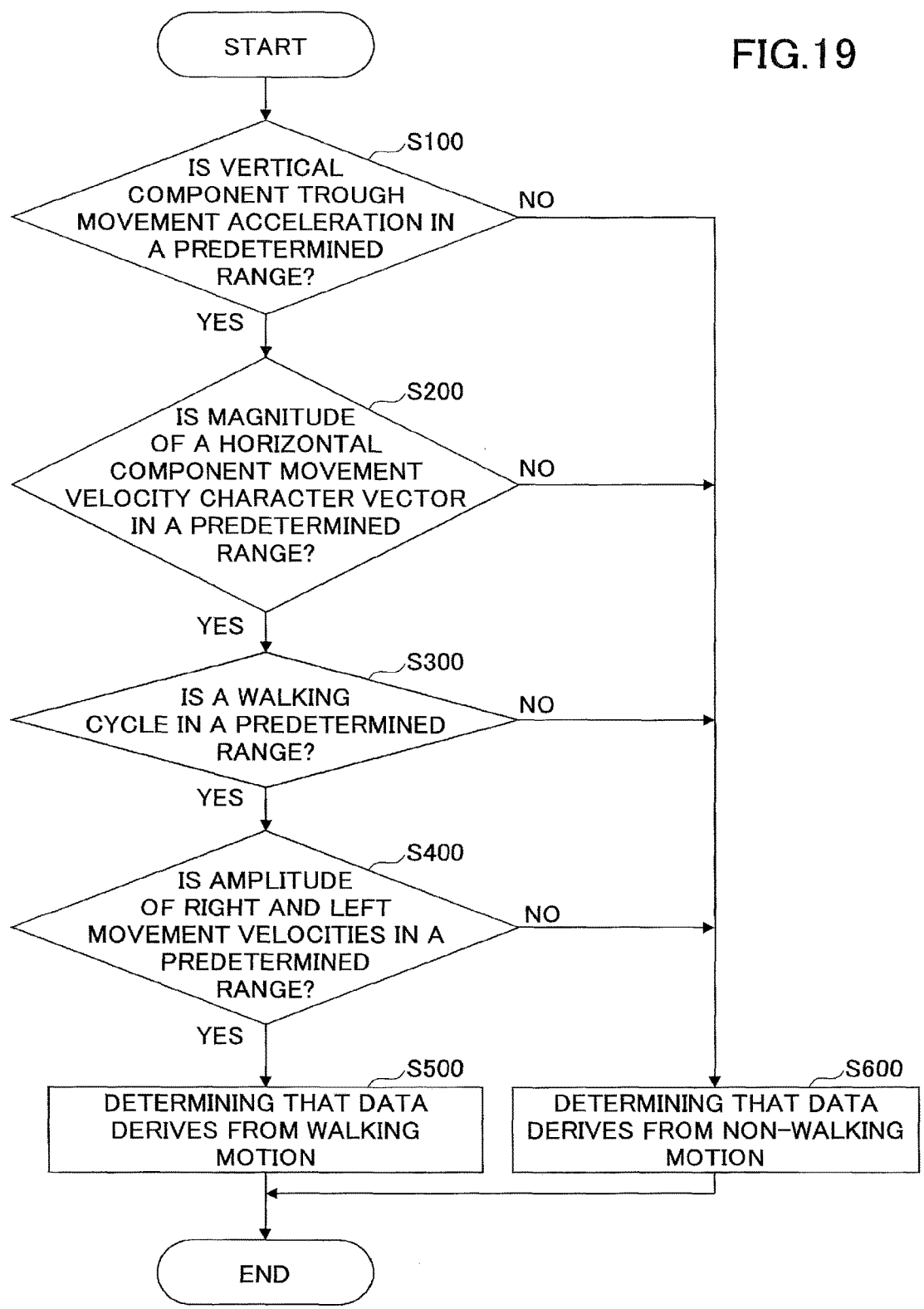
FIG. 19 is a flowchart illustrating a procedure for determining whether information is derived from a walking motion, according to the embodiment.

The determiner 211 executes processing illustrated in FIG. 19, in order to determine whether the above detected data is derived from a walking motion. A walking motion refers to a traveling motion of a person observed, which includes walking, running, etc. On the other hand, a non-walking motion refers to motions which do not solely drive from a traveling motion of the person observed, as exemplified by a motion of randomly and intentionally shaking the inertial device 1 and a motion affected by acceleration driving from an external environment (e.g. while moving in an external moving object). The following description explains the processing along with respective steps illustrated in FIG. 19.

First, in step S100, in a case where vertical component trough movement acceleration which is acquired by the vertical component trough movement acceleration acquirer 208 is in a predetermined range, the processing proceeds to step S200. Otherwise, the processing proceeds to step S600 and the determiner 211 determines that detected data drives from a non-walking motion. Here, the range of the vertical component trough traveling acceleration is predetermined by a manufacturer or a user of the inertial device 1, depending on characteristics of an object observed by the inertial device 1 (e.g. walking characteristics of a person).

Next, in step S200, in a case where a magnitude of the horizontal component movement velocity character information (vector) which is obtained from the horizontal component movement velocity character information manager 207 is in a predetermined range, the processing proceeds to step S300. Otherwise, the processing proceeds to step S600 and the determiner 211 determines that detected data drives from a non-walking motion. Here, the range of the magnitude of the horizontal component movement velocity character information (vector) is predetermined by a manufacturer or a user of the inertial device 1, depending on characteristics of an object observed by the inertial device 1 (e.g. walking characteristics of a person).

Next, in step S300, in a case where a movement cycle acquired from the cycle acquirer 210 is in a predetermined range, the processing proceeds to step S400. Otherwise, the processing proceeds to step S600 and the determiner 211 determines that detected data drives from a non-walking motion. Here, the range of the movement cycle is predetermined by a manufacturer or a user of the inertial device 1, depending on characteristics of an object observed by the inertial device 1 (e.g. walking characteristics of a person).

Next, in step S400, in a case where amplitude of right and left movement velocities is in a predetermined range, the processing proceeds to step S500 and the determiner 211 determines that detected data drives from a walking motion. Otherwise, the processing proceeds to step S600 and the determiner 211 determines that detected data drive forms a non-walking motion.

Figure 20A:
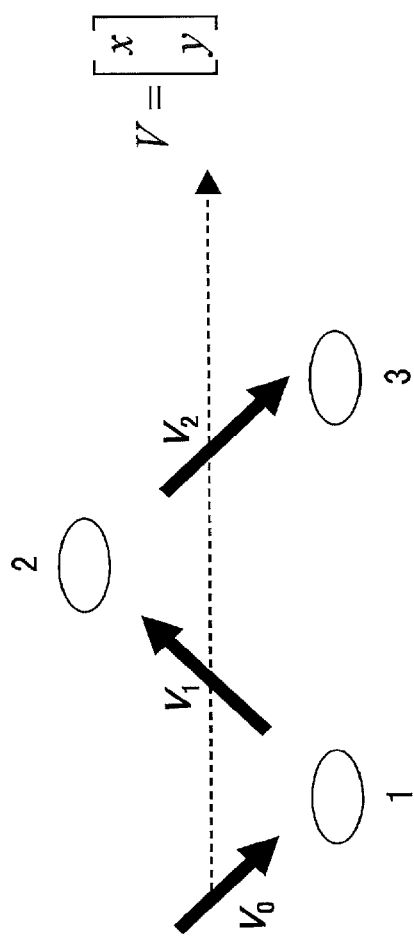
FIGS. 20A and 20B are drawings illustrating examples of amplitude of right and left movement velocities, according to the embodiment.

Here, amplitude of right and left movement velocities will be explained, with reference to FIGS. 20A and 20B. During walking motion of a human, a movement velocity vector is generated to the right when stepping forward with a right leg, whereas a movement velocity vector is generated to the left when stepping forward with a left leg. For a determination as described in step S400, the determiner 211 determines whether the horizontal component movement velocity character vector V conforms to such characteristics.

Figure 20B:
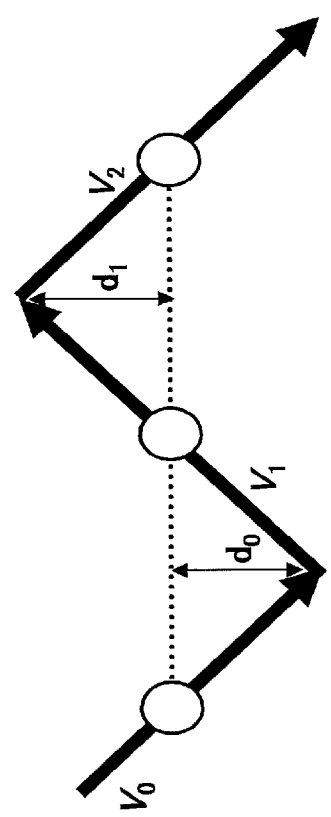

First, the determiner 211 connects starting points and ending points of the horizontal component movement velocity character vectors V as illustrated in FIG. 20B. Next, the determiner 211 calculates a distance dn between a line connecting midpoints of the horizontal component movement velocity character vectors Vn and an ending point of the horizontal component movement velocity character vectors Vn. Then, the determiner 211 determines whether the distance dn is in a predetermined range. In a case where the distance dn is in the predetermined range, the determiner 211 determines that detected data drives from a walking motion. Here, the range of the distance do is predetermined by a manufacturer or a user of the inertial device 1, depending on characteristics of an object observed by the inertial device 1 (e.g. walking characteristics of a person).

In step S500, the determiner 211 determines that detected data drives from a walking motion.

In step S600, the determiner 211 determines that detected data drives from a non-walking motion.

Here, some of the determination processing described in steps S100 through S400 may be omitted, although performing the whole processing enables more precise estimation of a traveling direction.

In a case where the determiner 211 described above determines that detected data is derived from a walking motion, the traveling direction calculator 212 performs processing described below, in order to calculate a traveling direction 218 per every step.

The traveling direction calculator 212 acquires a horizontal component movement velocity character vector $V_0$ from the horizontal component movement velocity character information acquirer 209, when a user takes the first step (as illustrated in FIG. 21A). Further, the traveling direction calculator 212 acquires a horizontal component movement velocity character vector $V_1$ from the horizontal component movement velocity character information acquirer 209, when a user takes the second step after the first step (as illustrated in FIG. 21A).

Here, the traveling direction calculator 212 obtains vectors $V_0'$ and $V_1'$ by normalizing the horizontal component movement velocity character vectors $V_0$ and $V_1$ (as illustrated in FIG. 21B). Then, the traveling direction calculator 212 calculates a resultant vector ($V_0'+V_1'$), in order to estimate the traveling direction 218 per every step, based on the direction of the resultant vector ($V_0'+V_1'$) (as illustrated in FIG. 21C). The above processing is performed upon every step of a user.

In order to estimate the traveling directions 218 per every step as described above, the inertial device 1 utilizes velocity vectors in the horizontal directions obtained in a predetermined time period having a trough of acceleration in the vertical direction of the absolute coordinate system at the midpoint. In such a way, estimation accuracy is improved, as influence of vibration, etc., due to a foot of a user landing on the ground is decreased.

Further, the inertial device 1 evaluates reliability of information obtained by the magnetometer. In a case where the information from the sensor is reliable, the inertial device 1 utilizes the information from the sensor for correction of a vector (i.e. yaw angle component) that indicates the posture of the inertial device 1. In such a way, the inertial device 1 is capable of correcting the vector that indicates the posture of the inertial device 1 with increased accuracy, by use of the magnetometer.

<Position Estimator>

Figure 22:
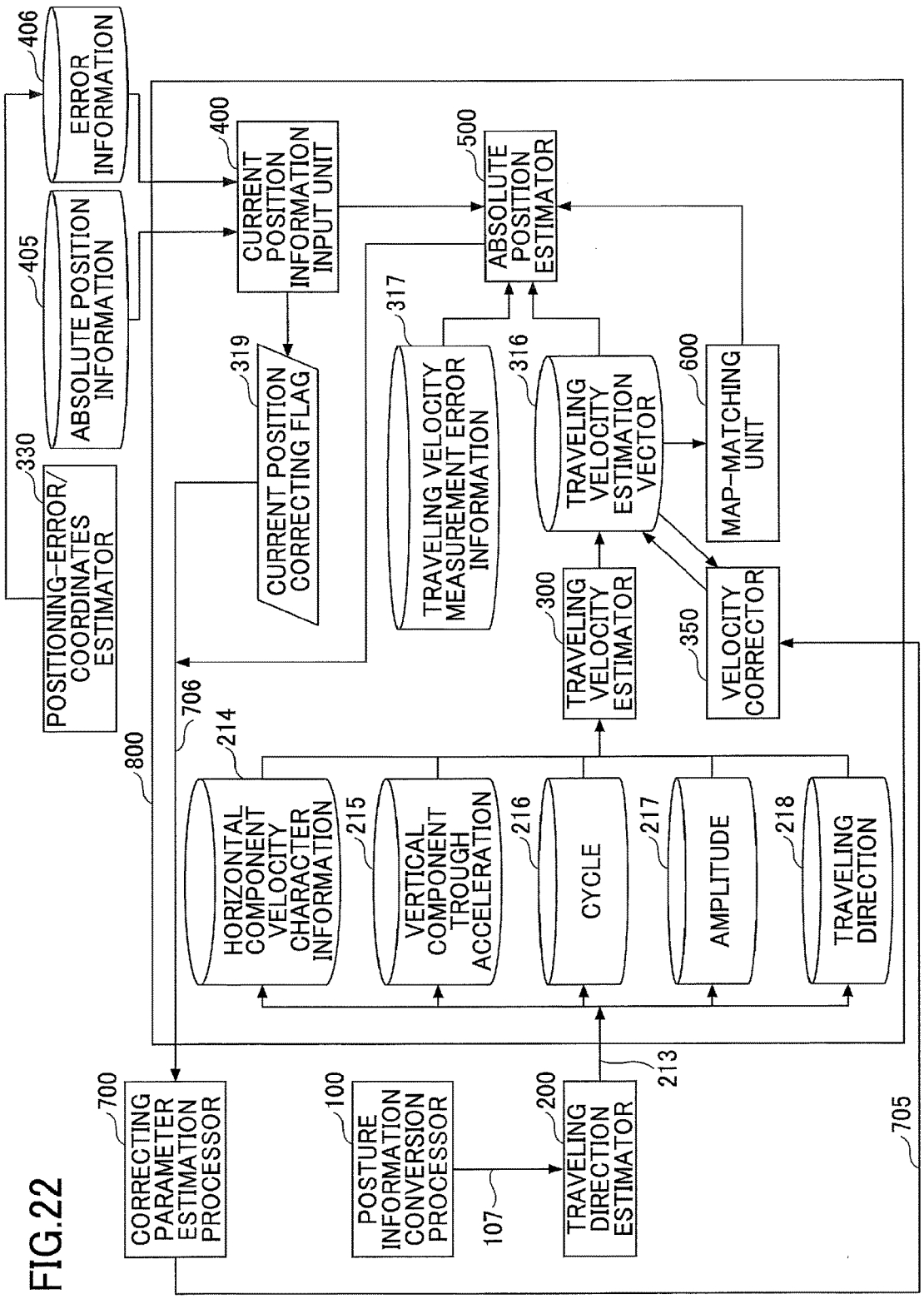
FIG. 22 a drawing illustrating an example of functions of a position estimator, according to the embodiment.

FIG. 22 is a drawing illustrating an example of functions of the position estimator 800. The position estimator 800 estimates a current position. The position estimator 800 includes a traveling velocity estimator 300, an absolute position information input unit 400, a current position estimator 500, a velocity corrector 350, and a map-matching unit 600. The following description explains functions of the traveling velocity estimator 300, the absolute position information input unit 400, the current position estimator 500, the map-matching unit 600, and the velocity corrector 350.

<<Traveling Velocity Estimator>>

Figure 23:
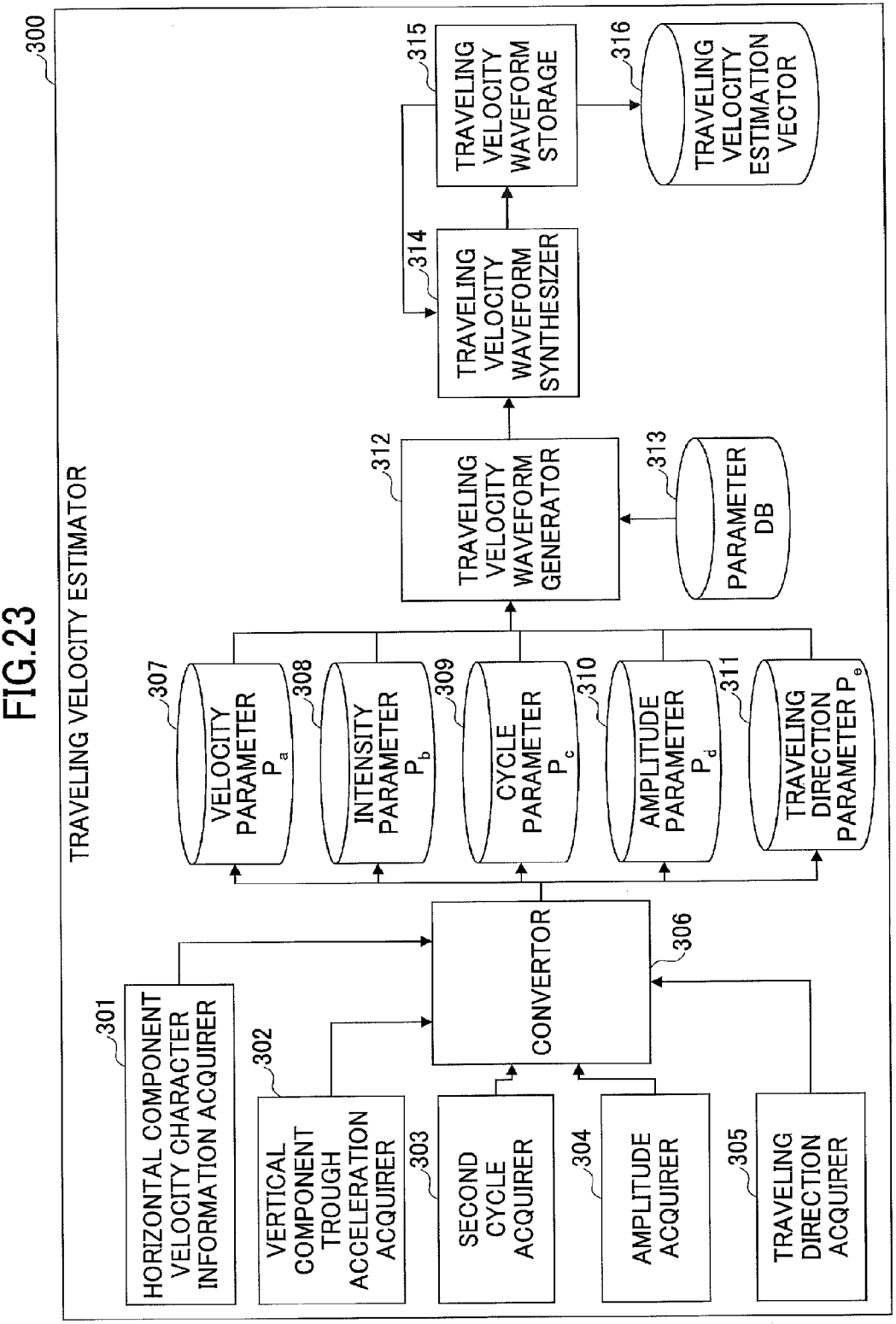
FIG. 23 is a detailed functional block diagram illustrating an example of a traveling velocity estimator, according to the embodiment.

In FIG. 23, a detailed functional block diagram of the traveling velocity estimator 300 is illustrated. The traveling velocity estimator 300 includes a horizontal component velocity character information acquirer 301, a vertical component trough acceleration acquirer 302, a second cycle acquirer 303, an amplitude acquirer 304, a traveling direction acquirer 305, a convertor 306, a traveling velocity waveform generator 312, a traveling velocity waveform synthesizer 314, and traveling velocity waveform storage 315.

The traveling velocity estimator 300 calculates a traveling velocity estimation vector which indicates an actual velocity of an observed object, based on horizontal component velocity character information 214, vertical component trough acceleration 215, a cycle 216, amplitude 217, and the traveling direction 218, which are calculated by the traveling direction estimator 200. In the following, processing executed by the traveling velocity estimator 300 will be described.

The horizontal component velocity character information acquirer 301 acquires the horizontal component velocity character information 214 (i.e. horizontal component velocity character vector) from the horizontal component movement velocity character information manager 207, and then inputs information regarding the horizontal component velocity character information 214 to the convertor 306.

The vertical component trough acceleration acquirer 302 acquires the vertical component trough acceleration 215 from the movement acceleration storage 206, and then inputs information regarding the vertical component trough acceleration 215 to the convertor 306.

The second cycle acquirer 303 acquires the cycle 216 with regard to a movement of an observed object based on information stored in the trough position storage 205, and then inputs information regarding the cycle 216 to the convertor 306.

The amplitude acquirer 304 acquires amplitude of right and left movement velocities (hereinafter referred to as amplitude 217), based on the horizontal component velocity character information 214, and then inputs information regarding the amplitude 217 to the convertor 306. The method for calculating the amplitude 217 is as described with reference to FIGS. 20A and 20B, etc.

The traveling direction acquirer 305 acquires the traveling direction 218 which is output from the traveling direction calculator 212 provided in the traveling direction estimator 200, and then inputs information regarding the traveling direction 218 to the convertor 306.

The convertor 306 converts the horizontal component velocity character information 214, the vertical component trough acceleration 215, the cycle 216, the amplitude 217, and the traveling direction 218 into a velocity parameter $P_a$ 307, an intensity parameter $P_b$ 308, a cycle parameter $P_c$ 309, an amplitude parameter $P_d$ 310, and a traveling direction parameter $P_e$ 311, respectively. For example, the convertor 306 may normalize such input data (assigned with reference signs 214 through 217), in accordance with predetermined rules. The convertor 306 may perform any appropriate methods for converting the input data into predetermined ranges of parameters.

The traveling velocity waveform generator 312 searches a parameter DB 313 (as illustrated in FIG. 23) using each of the parameters (assigned with reference signs $P_a$ 307 through $P_e$ 311) and preset attribute information of an observed object as search keys, in order to acquire velocity generating coefficients Ca through Cc corresponding to the search keys. Then, the traveling velocity waveform generator 312 generates a traveling velocity waveform through a formula below, using each of the parameters (assigned with reference signs $P_a$ 307 through $P_e$ 311) and the acquired velocity generating coefficients Ca through Cc.

Here, the attribute information of the observed object may include sex, age, and height of a user. The attribute information of the observed object may be any appropriate information for specifying the observed object. Other attribute information may be, for example, a type (e.g. a human, an animal, and a bipedal robot) of the observed object, an identification number, a model number, another property (e.g. high-speed and low-speed), etc., although the attribute information is not limited to as described.

The parameter DB 313 illustrated in FIG. 24 stores a sex, an age, and a height, which are attribute information, in association with the parameters (assigned with reference signs $P_a$ 307 through $P_d$ 310) and the velocity generating coefficients Ca through Cc. For convenience, in an example illustrated in FIG. 24, the traveling direction parameter $P_e$ 311 is not utilized for acquiring the velocity generating coefficients Ca through Cc (that is to say, the velocity generating coefficients Ca through Cc are acquired regardless of the traveling direction). However, the parameter DB 313 may include the traveling direction parameter $P_e$ 311.

The parameter DB 313 is preset by a provider, etc., of the inertial device 1, based on data which is obtained from a group of observed objects specified by attribute information performing each of the actions specified by the parameters (assigned with reference signs $P_a$ 307 through $P_e$ 311). Here, a norm value of the velocity parameter $P_a$ 307 is stored on the table of the parameter DB 313.

In a case where an entry that corresponds to the input parameters (assigned with reference signs $P_a$ 307 through $P_e$ 311) does not exist in the parameter DB 313, the traveling velocity waveform generator 312 acquires velocity generating coefficients Ca through Cc of an entry in which combination of parameters resembles the input parameters. For example, the traveling velocity waveform generator 312 may select an entry in which the sum of root-mean-square (RMS) of parameters is the smallest as a resembling entry. Any other appropriate method may be employed for selecting a resembling entry.

The traveling velocity waveform generator 312 generates traveling velocity waveforms which indicate changes in velocity of an observed object in a time period of $0 \leq t \leq Pc$ through such a formula as described below, using the velocity generating coefficients Ca through Cc and the input parameters (assigned with reference signs $P_a$ 307 through $P_e$ 311).

$$Ve_x = (P_a C_a + P_b C_b + P_d C_c) \sin\left(\frac{\pi}{P_C} t\right) \cos\theta \qquad \text{[Formula 14]}$$

$$Ve_y = (P_a C_a + P_b C_b + P_d C_c) \sin\left(\frac{\pi}{P_C} t\right) \sin\theta$$

Alternatively, the traveling velocity waveform generator 312 may generate traveling velocity waveforms by use of any other formula appropriate.

Figure 25:
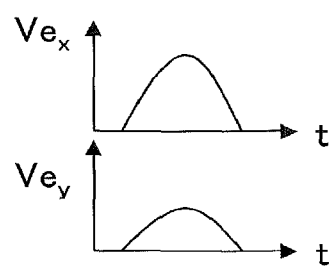
FIG. 25 is a drawing illustrating an example of traveling velocity waveforms, according to the embodiment.

An example of generated traveling velocity waveforms are illustrated in FIG. 25. Here, $\theta$ corresponds to the traveling direction parameter $P_e$ 311. Formula 14 includes an estimation term which relates to the velocity parameter $P_a$ 307 (i.e. first term), an estimation term which relates to the intensity parameter $P_b$ 308 (i.e. second term), and an estimation term which relates to the amplitude parameter $P_d$ 310 (i.e. third term). Each term is multiplied by each of the velocity generating coefficients Ca through Cc to reflect proportions. Performing velocity estimation by use of multiple parameters enables to generate an accurate traveling velocity waveform. Here, the velocity generating coefficients Ca through Cc are preliminarily normalized so that the sum of the velocity generating coefficients Ca through Cc is 1, and then stored in the parameter DB 313. The traveling velocity waveform generator 312 transmits the traveling velocity waveforms to the traveling velocity waveform synthesizer 314.

Upon receiving the traveling velocity waveforms from the traveling velocity waveform generator 312, the traveling velocity waveform synthesizer 314 retrieves traveling velocity waveforms which have been previously synthesized and stored in the later-described traveling velocity waveform storage 315, and then synthesizes the received traveling velocity waveform and the retrieved traveling velocity waveform. Here, the traveling velocity waveform synthesizer 314 synthesizes the traveling velocity waveforms by integrating the traveling velocity waveforms at corresponding positions on time axes. The traveling velocity waveform synthesizer 314 may synthesize traveling velocity waveforms in any other method appropriate (e.g., plotting the maximum values of multiple traveling velocity waveforms at corresponding positions on time axes).

Figure 26:
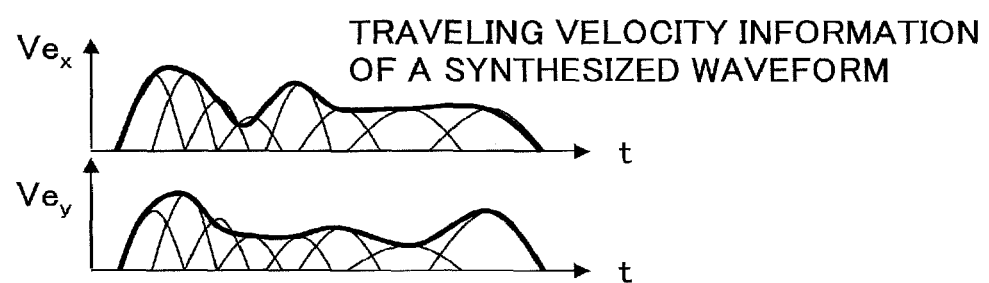
FIG. 26 is a drawing illustrating an example of synthesized traveling velocity waveforms, according to the embodiment.

FIG. 26 is a drawing illustrating an example of synthesis of multiple traveling velocity waveforms which is generated in integration processing performed by the traveling velocity waveform synthesizer 314. The traveling velocity waveform synthesizer 314 stores synthesized traveling velocity waveforms in the traveling velocity waveform storage 315.

The traveling velocity waveform storage 315 stores traveling velocity waveforms synthesized by the traveling velocity waveform synthesizer 314 in association with time information.

In such a way, the traveling velocity waveform storage 315 stores the most recently synthesized traveling velocity waveforms which are generated based on parameters acquired as needed. The current position estimator 500 and the map-matching unit 600, which are described later, are capable of obtaining traveling velocity information that represents the most recent traveling velocity, referring to the values of synthesized traveling velocity waveforms at the present time. As described above, a traveling direction is represented by two components in the horizontal direction. Thus, in the following, traveling velocity information is referred to as a traveling velocity estimation vector 316.

<<Absolute Position Information Input Unit>>

Figure 27:
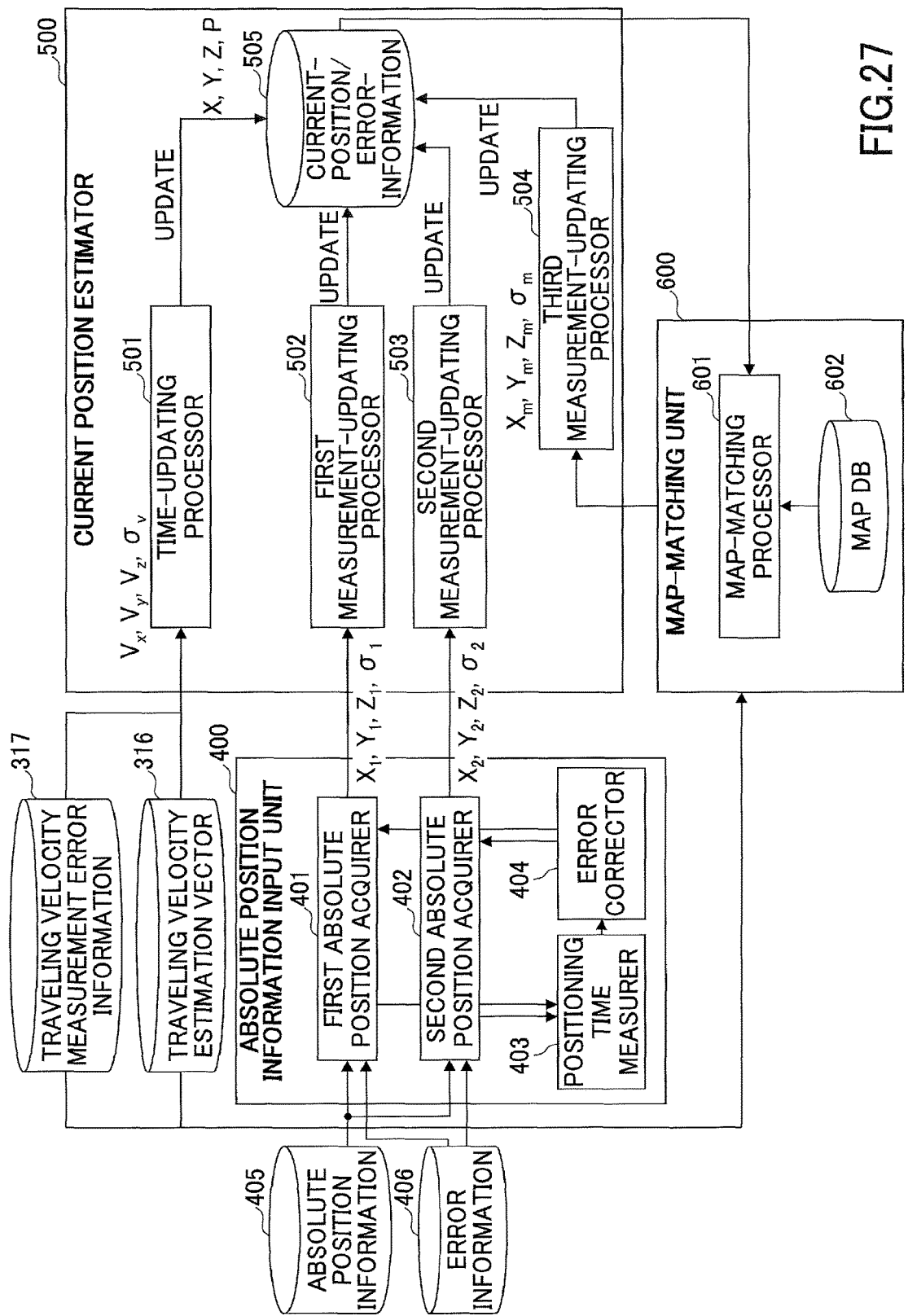
FIG. 27 is a functional block diagram illustrating an example of an absolute position information input unit, a current position estimator, and a map-matching unit of the inertial device, according to the embodiment.

FIG. 27 is a detailed functional block diagram illustrating the absolute position information input unit 400, the current position estimator 500, and the map-matching unit 600.

The absolute position information input unit 400 includes a first absolute position acquirer 401, a second absolute position acquirer 402, a positioning time measurer 403, and an error corrector 404. The absolute position information input unit 400 inputs to the current position estimator 500 information that indicates an absolute position of the inertial device 1 and error information that indicates an amount of error included in the information.

The first absolute position acquirer 401 acquires absolute position information that indicates an absolute position of the inertial device 1 through communicating with the transmitter 340 which is installed apart from the inertial device 1 via Bluetooth, etc. For example, absolute position information may be a positional vector $(X_1, Y_1, Z_1)$ expressed based on latitude, longitude, and altitude, or may be a positional vector having a predetermined point as a basepoint. The first absolute position acquirer 401 further acquires error information $\sigma_1$ which indicates an amount of error included in the above information. The error information $\sigma_1$ is an error covariance matrix relating to an absolute position, which is acquired from the above transmitter 340. For example, the error information $\sigma_1$ may include an error value which is determined in accordance with radio field intensity of a communication between the transmitter 340 and the inertial device 1. That is to say, in a case where radio field intensity is weak, an error covariance matrix indicative of a larger amount of error may be acquired. The error information $\sigma_1$ may be preliminarily stored in the inertial device 1 or may be transmitted from the transmitter 340. The acquired positional vector and the error information are transmitted to a later-described first measurement-updating processor 502 provided in the current position estimator 500.

Compared to the first absolute position acquirer 401, the second absolute position acquirer 402 acquires absolute position information $(X_2, Y_2, Z_2)$ and error information $\sigma_2$ by use of a different communication method (e.g. GPS and IMES). Here, the number of absolute position acquirers may be one or more. The acquired positional vector and the error information are transmitted to a later-described second measurement-updating processor 503 provided in the current position estimator 500.

Absolute position information and error information acquired by the first absolute position acquirer 401 and the second absolute position acquirer 402 are illustrated as absolute position information 405 and error information 406 in FIG. 22.

The positioning time measurer 403 measures an interval between times each of the first absolute position acquirer 401 and the second absolute position acquirer 402 acquires absolute position information, and then transmits information regarding the interval to the later-described error corrector 404.

The error corrector 404 determines whether a length of the interval received from the positioning time measurer 403 is in a predetermined range, and then corrects the error covariance matrix (i.e. $\sigma_1$ or $\sigma_2$) which is output by either the first absolute position acquirer 401 or the angular velocity acquirer 102 so as to have a larger covariance value, depending on the length of the interval. To this end, the error corrector 404 may utilize a preset table, in which intervals [second] and correcting amount (i.e. a value to be multiplied on a covariance value) are associated with each other. Alternatively, the error corrector 404 may perform a correction on the error covariance matrix in a case where the length of an interval exceeds a predetermined threshold value.

Figure 28:
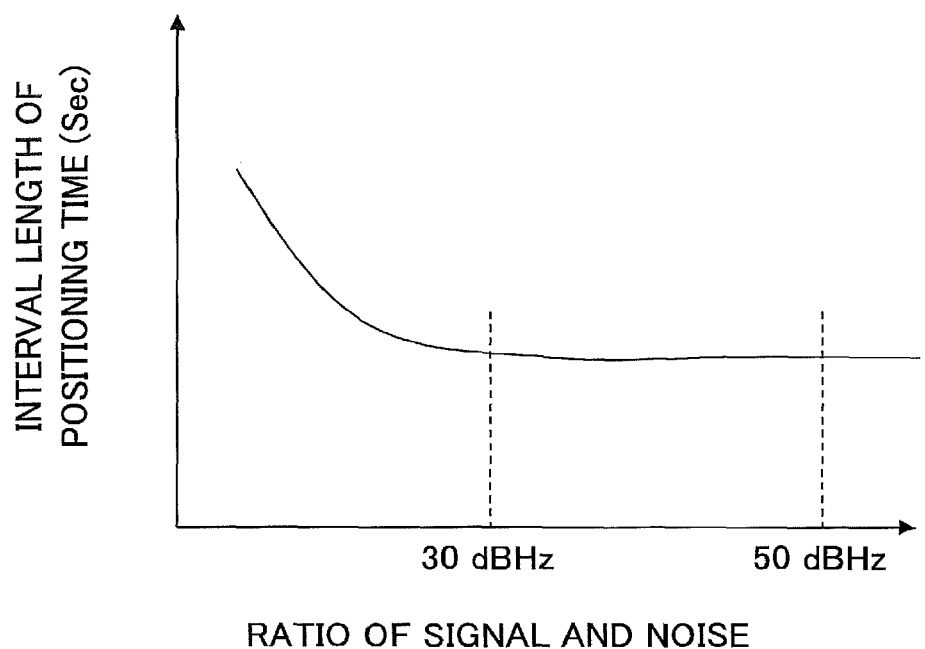
FIG. 28 is a drawing illustrating an example of a relationship between radio wave intensity and an interval of positioning times, according to the embodiment.

Especially, regarding error information relating to the GPS or the IMES, which is generated without regard to an influence of multipath propagation, reliability of the error information may differ depending on radio wave condition. There is a correlation between an S/N ratio, which indicates a ratio of amounts of signal and noise, and an interval length of positioning time, as illustrated in FIG. 28. Thus, the error corrector 404 may perform correction to enlarge a positioning error in a case where an interval length of positioning time exceeds a predetermined range, in order to reflect a change in reliability of error information. A case where error information is not directly transmitted will be described later.

Here, other than the above-described communication method, the transmitter 340 which is installed apart from the inertial device 1 may transmit absolute position information and error information by use of an infrared ray, a wireless LAN, a visible light communication, or a positioning method using camera, etc. In such a case, the inertial device 1 may receive the absolute position information and the error information through a corresponding receiving unit. The receiving unit may input the received absolute position information and error information to a measurement-updating processor provided in the current position estimator 500, similarly to the above-described absolute position acquirers. There is no limitation regarding the number of absolute position acquirers and measurement-updating processors.

<<Current Position Estimator>>

The current position estimator 500 includes a time-updating processor 501, the first measurement-updating processor 502, the second measurement-updating processor 503, and a third measurement-updating processor 504.

The current position estimator 500 calculates a current position and error information indicating an error with respect to the current position (i.e. current-position/error-information 505), based on a traveling velocity estimation vector 316 and a traveling velocity measurement error information 317 which is provided along with the traveling velocity estimation vector 316. The traveling velocity measurement error information 317 is an error covariance matrix $\sigma_v$ indicative of an error with regard to the traveling velocity estimation vector 316, which is fixed data obtained in system identification. Alternatively, the traveling velocity measurement error information 317 may be obtained from multiple sets of data, depending on traveling velocity.

In addition, the current position estimator 500 updates the current-position/error-information 505, based on absolute position information (i.e. positional vector) and error information (i.e. error covariance matrix) which are output by the absolute position information input unit 400. Further, the current position estimator 500 updates current-position/error-information 505, based on absolute position information (i.e. positional vector) and error information (i.e. error covariance matrix) which are output by the map-matching unit 600.

The current-position/error-information 505 is calculated and updated by use of an extended Kalman filter. Here, a time-updating procedure (performed by the time-updating processor 501) and three measurement-updating procedures (performed by the first measurement-updating processor 502, the second measurement-updating processor 503, the third measurement-updating processor 504, respectively) are executed in a parallel way. Models and variables used in the above procedures will be explained below.

Figure 30:
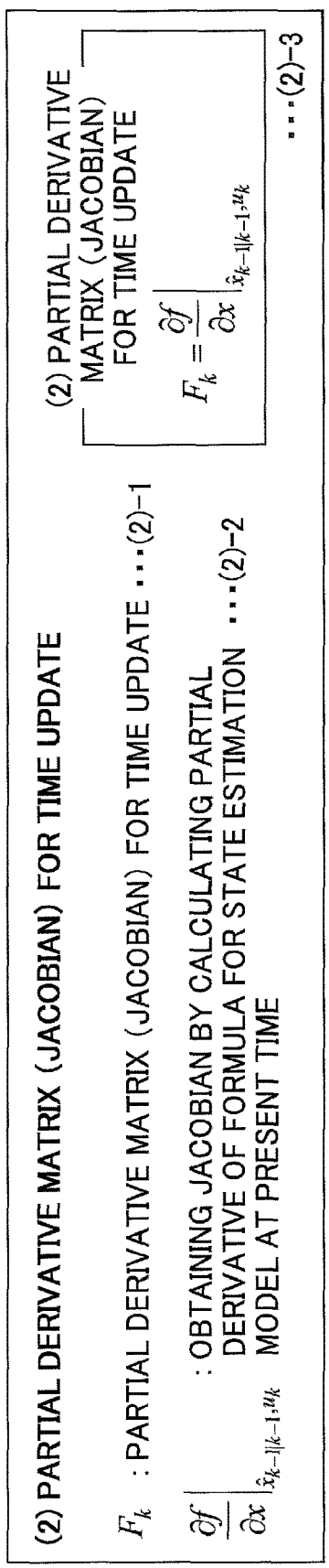
FIG. 30 is a drawing illustrating an example of calculation of a current position in the time-updating procedure, according to the embodiment.

The time-updating processor 501 executes the time-updating procedure of the extended Kalman filter in accordance with definitions of the models and variables illustrated in FIGS. 29 through 31, so as to calculate and update the current-position/error-information 505 of the inertial device 1. Here, the models and variables of the extended Kalman filter may be defined as illustrated in FIG. 29. As illustrated, an estimate of the state at the present time may be defined by a three dimensional positional vector as illustrated in the expression (1)-1 of FIG. 29. Further, as illustrated in the expression (1)-4 of FIG. 29, an input value may be defined by the traveling velocity estimation vector 316, which is output from the traveling velocity estimator 300. Further, a system state estimation model may be defined as illustrated in the expression (1)-4 of FIG. 29.

Furthermore, as illustrated in FIG. 30, a partial derivative matrix (i.e. jacobian) for the time-updating procedure is a partial derivative of the right side member of the system state estimation model.

Furthermore, as illustrated in FIG. 31, a process noise $Q_k$ is the traveling velocity measurement error information 317 (i.e. $\sigma_v$), which is a constant that is calculated preliminarily in a system identification process. Here, the error covariance matrixes $P_{k|k-1}$ and $P_{k-1|k-1}$ form 3 by 3 matrixes, in which each element is a real number The first measurement-updating processor 502 executes the measurement-updating procedure of the extended Kalman filter, so as to calculate and update the current-position/error-information 505 of the inertial device 1. Here, the variable of the extended Kalman filter will be described with reference to FIG. 32. Here, a measurement (vector) h at the previous time step is expressed by a three dimensional positional vector, as illustrated in the expression (1)-3 of FIG. 32. Further, the measurement $z_k$ is a positional vector (i.e. absolute position information) output from the first absolute position acquirer 401, as illustrated in the expression (1)-2 of FIG. 32. A measurement residual is obtained based on the above-described measurement (vector) h at the previous time step and measurement $z_k$.

$$\tilde{y}_k$$ [Formula 15]

Further, (2) a partial derivative matrix (i.e. Jacobian) $H_k$ in the measurement-updating procedure of the general expression of the extended Kalman filter may be obtained by calculating a partial derivative of the measurement h as expressed by an expression (1)-3 in FIG. 32.

Further, (3) a residual covariance $S_k$ in the general expression of the extended Kalman filter may be obtained by use of a measurement noise (matrix) $R_k$, which is error information output from the first absolute position acquirer 401, the partial derivative matrix $H_k$ of the measurement-update procedure, a transposed matrix $H_k^T$ of the partial derivative matrix $H_k$, and an error covariance matrix $P_{k|k-1}$ at the present time.

$$R_k = \sigma_1 = \begin{bmatrix} r_1 & 0 & 0 \\ 0 & r_2 & 0 \\ 0 & 0 & r_3 \end{bmatrix}$$ [Formula 16]

Here, $r_1$, $r_2$, and $r_3$, represent X-axis, Y axis, and Z-axis, respectively.

Further, (4) a Kalman gain $K_k$ in the general expression of the extended Kalman filter may be obtained by use of the error covariance matrix $P_{k|k-1}$ at the present time, the transposed matrix $H_k^T$ of the partial derivative matrix $H_k$ regarding the measurement-updating procedure, and an inverse matrix $S_{k-1}$ of the residual covariance $S_k$.

Similarly, (5) an updated estimate $x_{k|k}$ of the state and (6) an updated error covariance matrix $P_{k|k}$ in the general expression of the extended Kalman filter may be obtained by use of the above-described variables.

Similarly to the first measurement-updating processor 502, the second measurement-updating processor 503 executes the measurement-updating procedure of the extended Kalman filter, so as to calculate and update the current-position/error-information 505 of the inertial device 1. Variable in the extended Kalman filter are the same as in the first measurement-updating processor 502, except that the measurement $z_k$ and the measurement noise $R_k$ are respectively a positional vector and error information output from the second absolute position acquirer 402.

Similarly to the first measurement-updating processor 502, the third measurement-updating processor 504 executes the measurement-updating procedure of the extended Kalman filter, so as to calculate and update the current-position/error-information 505 of the inertial device 1. Variable in the extended Kalman filter are the same as in the first measurement-updating processor 502, except that the measurement $z_k$ and the measurement noise $R_k$ are respectively a positional vector and error information output from the map-matching unit 600.

As described above, the current position estimator 500 properly updates the current-position/error-information 505 by use of the extended Kalman filter, so as to precisely estimate a current position. Not only an estimated current position, an orientation of the inertial device 1 (i.e. heading information, an estimate of yaw angle) may be obtained by use of an external application provided in the inertial device 1, with reference to the current-position/error-information 505.

Here, the current position correcting flag 319 is turned to be TRUE, in response to a calculation or an update of the current-position/error-information 505 of the inertial device which is performed by the first measurement-updating processor 502 or the second measurement-updating processor 503. The "TRUE" current position correcting flag 319 is turned to be "FALSE", upon being transmitted to the correcting parameter estimation processor 700 (in other words, the "TRUE" current position correcting flag 319 is cleared before a current-position/error-information 505 in the next step is transmitted).

<<Map-Matching>>

The map-matching unit 600 includes a map-matching processor 601. The map-matching unit 600 acquires the most recent current-position/error-information 505 and traveling velocity estimation vector 316, and then performs map-matching processing.

The map-matching processor 601 acquires the most recent current-position/error-information 505 and a traveling velocity estimation vector 316, and also acquires area information indicating travelable areas, referring to a preset map DB 602. Then, the map-matching processor 601 preforms map-matching processing by use of a generally-known particle filter algorithm (see, I. M. Rekleitis, "A particle filter tutorial for mobile robot localization", Technical Report TR-CIM-04-02, 2004, Centre for Intelligent Machines, McGill University). In a case where the current position is not on a travelable area on a map, the map-matching processor 601 corrects the current position to be on a travelable area. Further, the map-matching processor 601 performs an internal processing to calculate an error covariance matrix $\sigma_m$ which indicates an amount of error with respect to each component of the corrected positional vector. The map-matching processor 601 transmits the error covariance matrix $\sigma_m$ and the positional vector $(X_m, Y_m, Z_m)$ indicating the corrected current position to the third measurement-updating processor 504 provided in the current position estimator 500 as described above.

<Velocity Corrector>

The velocity corrector 350 performs correcting processing on a traveling velocity estimation vector 316, based on the walking speed correcting parameter 705 which is transmitted from the correcting parameter estimation processor 700. A method for performing the correcting processing may be, for example, multiplying the traveling velocity estimation vector 316 by the walking speed correcting parameter 705. Alternatively, the method may be storing correction values in association with respective walking speed correcting parameters 705 on a lookup table, and then multiplying the traveling velocity estimation vector 316 by a correction value corresponding to a walking speed correcting parameter 705, which is obtained from the lookup table. In such a case, a non-linear correction is possible. Here, methods for performing the correcting processing is not limited to be as described.

Figure 33:
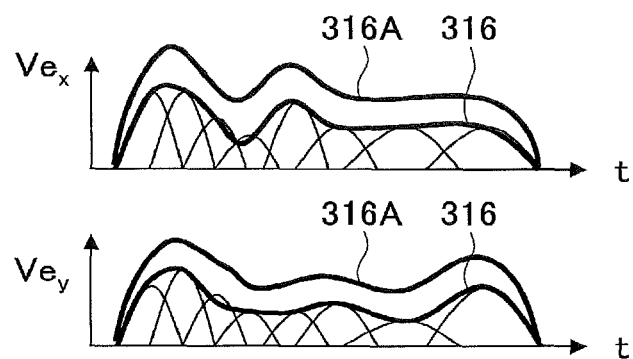
FIG. 33 is a schematic diagram illustrating corrected velocity information, according to the embodiment.

FIG. 33 is a schematic diagram illustrating an example of corrected velocity information 316A. Here, velocity information obtained as a result of synthesizing waveforms is corrected based on the walking speed correcting parameter 705, in order to obtain the corrected velocity information 316A. Here, although the velocity information is greater as a result of the correction in the example of FIG. 33, the velocity information may be smaller as a result of correction.

<Positioning-Error/Coordinates Estimator>

The positioning-error/coordinates estimator 330 performs processing for estimating error information with regard to absolute position coordinates. For example, although the inertial device 1 may receive absolute position information using radio waves through the Bluetooth communication module 20, etc., the absolute position information indicates a position of the transmitter 340 which transmits the absolute position information, which is not the position of the inertial device 1. However, in such a case, the positioning-error/coordinates estimator 330 estimates an error, based on intensity of a received signal.

TABLE 1

| ABSOLUTE POSITION INFORMATION ID | LATITUDE (deg.) | LONGITUDE (deg.) | INTENSITY OF RECEIVED SIGNAL (dBm) |
|---|---|---|---|
| P1 | 35.614054 | 139.835791 | 50 |
| P2 | 35.614028 | 139.835941 | 40 |

In Table 1, absolute position information transmitted from the transmitters 340 that respectively form the receiving areas AREA1 and AREA2 in FIG. 1 are illustrated. Latitudes and longitudes corresponding to absolute position information IDs are transmitted to inertial devices 1 around the transmitters 340. The inertial device 1 measures intensity of a received signal while receiving the absolute position information. The positioning-error/coordinates estimator 330 is capable of estimating error information by use of intensity of a received signal.

Figure 34:
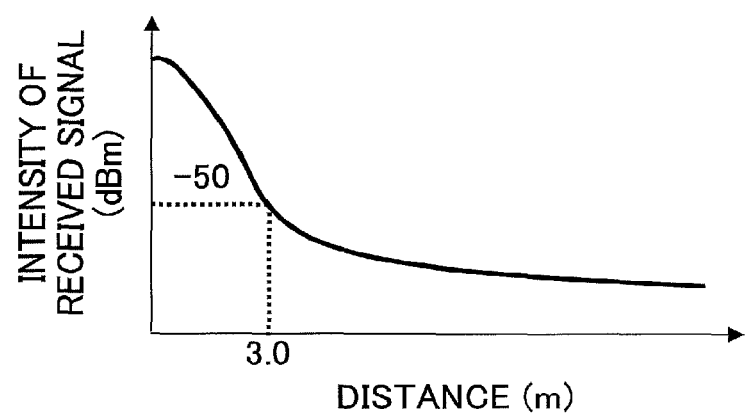
FIG. 34 is a drawing illustrating an example of changes in intensity of a received signal in relation to a distance between a transmitter of absolute position information and the inertial device, according to the embodiment.

FIG. 34 is a drawing illustrating an example of changes in intensity of a received signal in relation to a distance between the transmitter 340 of the absolute position information and the inertial device 1. By providing such a waveform, the positioning-error/coordinates estimator 330 is capable of estimating a distance between the transmitter 340 and the inertial device 1, based on intensity of a received signal measured when the inertial device 1 receives absolute position information. Specifically, the positioning-error/coordinates estimator 330 may utilize a function or a table for converting intensity of a received signal into a distance, which is preliminarily set by a person who installs the transmitter 340, etc., in order to estimate error information 406 based on the distance. Such error information 406 is utilized as illustrated in FIG. 22.

Here, in a case where the transmitter 340 transmits absolute position information by use of sonic wave (i.e. sound/non-audible sound), the positioning-error/coordinates estimator 330 may estimate an error based on a time until a sound/non-audible sound reaches the inertial device 1 or a volume of a received sound.

Further, the transmitter 340 may only transmit an absolute position information ID, not absolute position information itself. In such a case, the inertial device 1 refers to a table preliminarily provided for managing absolute position information corresponding to absolute position information IDs, so as to obtain absolute position information.

<Correcting Parameter Estimation Processor>

The correcting parameter estimation processor 700 illustrated in FIG. 4 includes a correcting parameter calculator 701, a moving state detector 702, and positioning history storage 703. First, the positioning history storage 703 stores current positions and error information, in association with time information. Here, the positioning history storage 703 is embodied by the RAM 12 and the ROM 13.

The positioning history storage 703 stores positions corrected by parametric statistics performed by the first measurement-updating processor 502 and the second measurement-updating processor 503, as well as positions obtained by the time-updating processor 501 in the PDR system. In a case where determination of moving state as described below is not performed, the positioning history storage 703 may only store the corrected positions.

The moving state detector 702 detects whether a movement detected by the inertial device 1 is derived from a person walking or running or from a correction of a position. Specifically, the positioning history storage 703 stores positions estimated from the last time the current position correcting flag "TRUE" is detected to the next time the current position correcting flag "TRUE" is detected. As the change between the positions estimated from the last time the current position correcting flag "TRUE" is detected to the next time the current position correcting flag "TRUE" is detected is a movement distance obtained solely in the PDR system, it may be determined that, in a case where a detected change is more than a predetermined distance, the movement drives from a person walking or running. The predetermined distance may be properly preset. The predetermined distance may be a few meters to a few dozens of meters, but is not limited to be as described.

Processing performed by the correcting parameter calculator 701 will be described, with reference to FIG. 1. A position P'1 is a position of the inertial device 1 which is corrected in parametric statistics based on absolute position information at the last time a "TRUE" current position correcting flag is received. Positions constituting a trajectory 1012, a position 1001, and the position P'1 are stored in the positioning history storage 703. Furthermore, when a position of the inertial device 1 is corrected in parametric statistics based on absolute position information, a corrected position P'2 is stored. Data of the position P'1 and data of the position P'2 are transmitted along with "TRUE" current position correcting flags.

Before receiving a "TRUE" current position correcting flag, the inertial device 1 is estimated to be at the position 1001 according solely to the PDR system. Upon receiving absolute position information at a receiving area AREA2, the position 1001 is corrected to the position P'2.

Here, there are deviations with regard to distances and directions while the inertial device 1 moves from the receiving area AREA1 to the receiving area ARE2. The correcting parameter calculator 701 generates correcting parameters for correcting the deviations. Specifically, the correcting parameter calculator 701 calculates a distance B which is from the position P'1 to the position 1001 and a distance A which is from the position P'1 to the position P'2. As a position estimated in the PDR system tends to be further than a correct position by a proportion of "distance B/distance A", a walking speed correcting parameter 705 is "distance A/distance B".

Furthermore, as the deviation between a direction from the position P'1 to the position P'2 and a direction from the position P'1 to the position 1001 is an error from a correct direction of the inertial device 1, a yaw angle correcting value $\Delta\psi$ is obtained based on the deviation. Alternatively, a yaw angle correcting value $\Delta\psi$ may be obtained by use of, for example, directions from a position after a few steps from the position P'1 to the position P'2 and to the position 1001, instead of utilizing the directions from the position P'1 to the position P'2 and to the position 1001. That is to say, the basepoint for calculating directions need not be the position P'1, and may be any past positions stored in the positioning history storage 703. However, it is preferable that the basepoint is a position which is closer to the position indicated by data received along with the "TRUE" current position correcting flag, compared to the other positions indicated by data received after receiving the data transmitted along with the "TRUE" current position correcting flag.

Instead of utilizing such an above described directional deviation itself as a yaw angle correcting value $\Delta\psi$, the correcting parameter calculator 701 may adjust the directional deviation depending on an amount of error included in error information which is calculated at the time of correcting a position in parametric statistics. For example, in a case where a calculating result of dividing the error information by a predetermined threshold value is smaller than 1, the directional deviation itself is determined to be the yaw angle correcting value $\Delta\psi$. In a case where the calculating result is greater than 1, a value obtained by multiplying the directional deviation by the calculation result is determined to be the yaw angle correcting value $\Delta\psi$. In such a way, a traveling direction is corrected to a large extent, in a case where an error indicated by error information is large.

As described above, the posture information conversion processor 100 corrects a direction (i.e. yaw angle) of the inertial device 1 based on a yaw angle correcting value 704 every time absolute position information is acquired. Further, a position detected according to the PDR system is properly corrected as the position estimator 800 corrects a traveling velocity estimation vector based on the walking speed correcting parameter 705.

<Overall Operation of Inertial Device>

Figure 35:
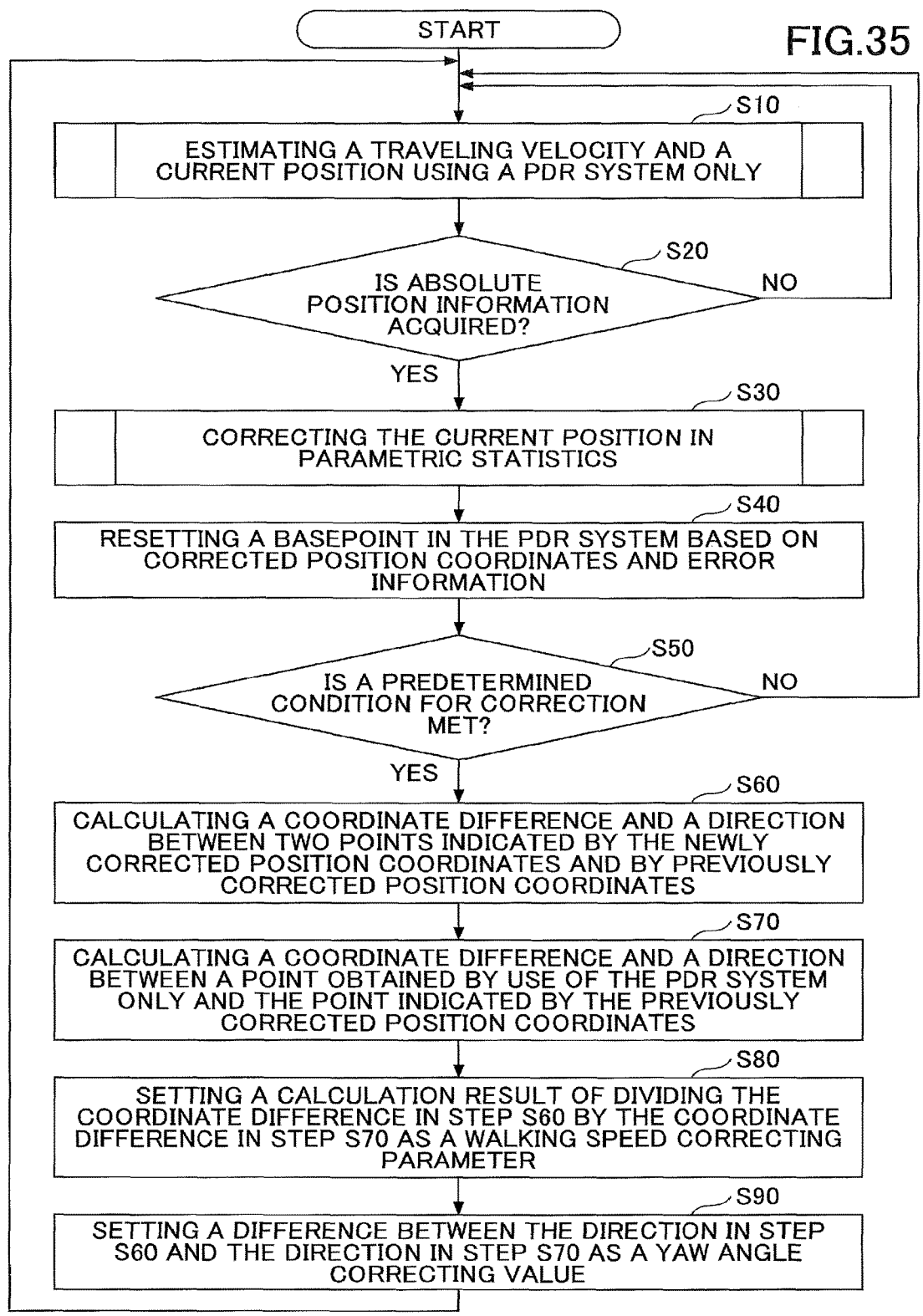
FIG. 35 is a flowchart illustrating an example of a procedure for estimating a traveling velocity estimating parameter and a yaw angle correcting value, according to the embodiment.

FIG. 35 is a flowchart illustrating an example of a procedure for estimating a walking speed correcting parameter 705 and a yaw angle correcting value 704.

The position estimator 800 estimates a traveling velocity and a current position of an observed object based on the PDR system, using a traveling direction 218 estimated by the traveling direction estimator 200 (S10 of FIG. 35).

Then, in an event where the absolute position information input unit 400 acquires absolute position information from the transmitter 340 when the inertial device 1 enters a receiving area (YES in S20 of FIG. 35), the position estimator 800 corrects the current position in parametric statistics, and then estimates position coordinates and error information regarding the position coordinates (S30 of FIG. 35).

Then, the position estimator 800 sets the position coordinates corrected by use of the absolute position information and the error information as a current position in the PDR system (S40 of FIG. 35). In other words, a basepoint, from which position coordinates are accumulated in the PDR system in accordance with traveling velocity, is reset based on position coordinates corrected by use of the absolute position information and the error information. Here, a "TRUE" current position correcting flag is transmitted to the correcting parameter estimation processor 700.

Then, the correcting parameter calculator 701 determines whether conditions for correction are met (S50 of FIG. 35). One of the conditions for correction is that it is indicated, based on archival records of the position coordinates in the PDR system, that an observed object has moved between two points which are located at a predetermined distance from each other. The other is that error information obtained at the time of correcting position coordinates in parametric statistics by use of absolute position information falls below a threshold value. According to the former condition, it is determined that the movement does not derive from a correction of a position in response to receiving an absolute position information (in other words, it is determined that the movement detected by the inertial device 1 is derived from walking or running of a person). According to the latter condition, it is indicated that there is an error with regard to a positioning result in the PDR system or with regard to absolute position information. Here, although a preferable correcting parameter may be generated by determining both of the condition, a correcting parameter may be generated only by determining one or none of the conditions.

In a case where a determination result in step S50 of FIG. 35 is YES, the correcting parameter calculator 701 calculates a coordinate difference (i.e. distance) and a direction between a newly corrected position coordinates and the lastly corrected position coordinates (S60 of FIG. 35).

Then, the correcting parameter calculator 701 calculates a coordinate difference (i.e. distance) and a direction between two points obtained solely by the PDR system (S70 of FIG. 35). The basepoint of the two sets of coordinates obtained solely by the PDR system is the one which has been reset in the above description.

Then, the correcting parameter calculator 701 sets a calculation result of dividing the coordinate difference in step S60 of FIG. 35 by the coordinate difference in step S70 of FIG. 35 as a walking speed correcting parameter 705, and then transmits the walking speed correcting parameter 705 to the velocity corrector 350 provided in the position estimator 800 (S80).

Furthermore, as feedback, the correcting parameter calculator 701 transmits to the posture information conversion processor 100 the deviation between the direction in step S60 of FIG. 35 and the direction in S70 of FIG. 35 as a yaw angle correcting value (S90). Subsequently, the steps S10 through S90 of FIG. 35 will be repeatedly executed.

<Positioning Result>

Figure 36:
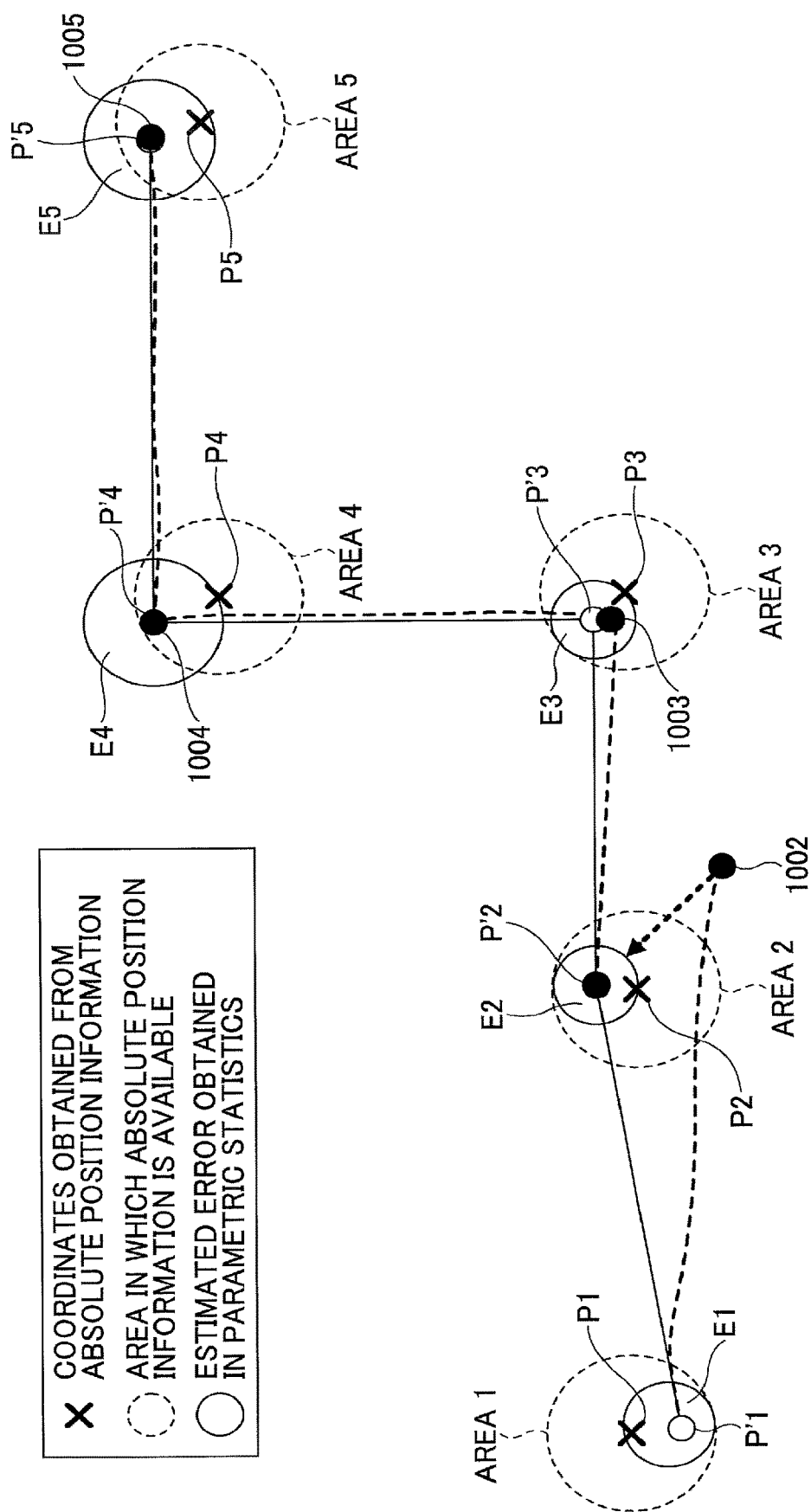
FIG. 36 is a drawing illustrating an example of positioning results obtained while a user moves between five receiving areas, according to the embodiment.

FIG. 36 is a drawing illustrating an example of positioning results obtained while an observed object moves between five receiving areas AREA1 through AREA5 and how corrections are performed. Absolute positions P1 through P5 are specified by absolute position information transmitted by the respective transmitters 340. Positions P'1 through P'5 are positions corrected in parametric statistics based on the absolute position information. Further, positions 1002 through 1005 are estimated solely by the PDR system. The receiving areas AREA1 through AREA5 are areas in which absolute position information transmitted by the respective transmitter 340 is available. Errors E1 through E5 are specified by error information obtained at the time when the respective corrections in the parametric statistics are performed.

Although the position 1002 which is estimated by the PDR system is far from the absolute position P2, the position 1002 is corrected to the position P'2 based on absolute position information in the receiving area AREA2. Then, the positions 1003 through 1005 are corrected in the respective receiving areas AREA3 through AREA5, although the positions 1003 through 1005 which are estimated by the PDR system are not so far from the corresponding positions P'3 through P'5.

TABLE 2

| ABSOLUTE POSITION INFORMATION ID | LATITUDE (deg.) | LONGITUDE (deg.) | INTENSITY OF RECEIVED SIGNAL (dBm) |
|---|---|---|---|
| P1 | 35.614054 | 139.835791 | 50 |
| P2 | 35.614028 | 139.835941 | 40 |
| P3 | 35.614010 | 139.836065 | 40 |
| P4 | 35.614172 | 139.836059 | 60 |
| P5 | 35.614115 | 139.836124 | 60 |
| ... | ... | ... | ... |

| RESULT OF POSITIONING CORRECTION IN PARAMETRIC STATISTICS | LATITUDE (deg.) | LONGITUDE (deg.) | ESTIMATED ERROR (m) |
|---|---|---|---|
| P'1 | 35.614051 | 139.835780 | 2.5 |
| P'2 | 35.614030 | 139.835940 | 2.4 |
| P'3 | 35.614008 | 139.836061 | 2.0 |

TABLE 2-continued

| P'4 | 35.614160 | 139.836051 | 3.0 |
| P'5 | 35.614120 | 139.836121 | 3.2 |
| ... | ... | ... | ... |

The absolute position information output by the transmitters 340 and the positions corrected in parametric statistics are illustrated in Table 2.

As illustrated in FIG. 36 and Table 2, a current position is updated by use of parametric statistics, based on error information received along with absolute position information. That is to say, in a case where an error is infinitesimally small, an updated current position is near the position coordinates indicated by absolute position information of an absolute position P1, P2, P3, P4, or P5. On the other hand, in a case where an error is large, an updated current position is at an offset coordinates located away from an origin by an amount corresponding to an error value, where the origin is at the position coordinates indicated by absolute position information of an absolute position P1, P2, P3, P4, or P5.

Here, as an advantage of employing parametric statistics, reliability (i.e. error covariance matrix) concerning correction of an estimated value is determined based on an amount of error, so as to perform an interpolation between uncorrected position coordinates and corrected position coordinates. In such a way, as an advantage of employing parametric statistics, more accurate position estimation may be performed, compared to employing a method in which, upon receiving absolute position information, a current position is corrected to be exactly at position coordinates indicated by the absolute position information.

In a case of employing such a method in which a current position is corrected to be exactly at position coordinates obtained from absolute position information, the steps S50 through S90 illustrated in FIG. 35 are simply executed even though there is a large amount of error with respect to absolute position information. That is to say, accuracies of estimating a walking speed correcting parameter 705 and a yaw angle correcting value 704 may be decreased. Moreover, the estimation may be performed incorrectly.

In the embodiment of the present invention, as an advantage of employing parametric statistics for executing the steps S50 through S90 of FIG. 35, accuracies of estimating a walking speed correcting parameter 705 and a yaw angle correcting value 704 may be improved.

Furthermore, according to the embodiment of the present invention, the walking speed correcting parameter 705 is not affected by the way an observed object moves between two points because a distance is obtained based on position coordinates of the two points. In a method disclosed in Japanese Unexamined Patent Application Publication No. 2013-050307, upon detecting that a user walks for a predetermined distance based on acquired absolute positions, a walking tempo is stored in association with a parameter, which indicates a step length or a walking speed of a user. However, in the method, in a case where the user walks between two points in a tortuous manner, reliable distance information with may not be obtained because the information is based on the number of steps and the walking tempo.

As described above, accuracies of estimating positions in the PDR system may be enhanced by providing a feedback for the purpose of correcting a position based on an estimated walking speed correcting parameter 705 and yaw angle correcting value 704 and by improving accuracies of estimating the walking speed correcting parameter 705 and the yaw angle correcting value 704 using parametric statistics.

Figure 37B:
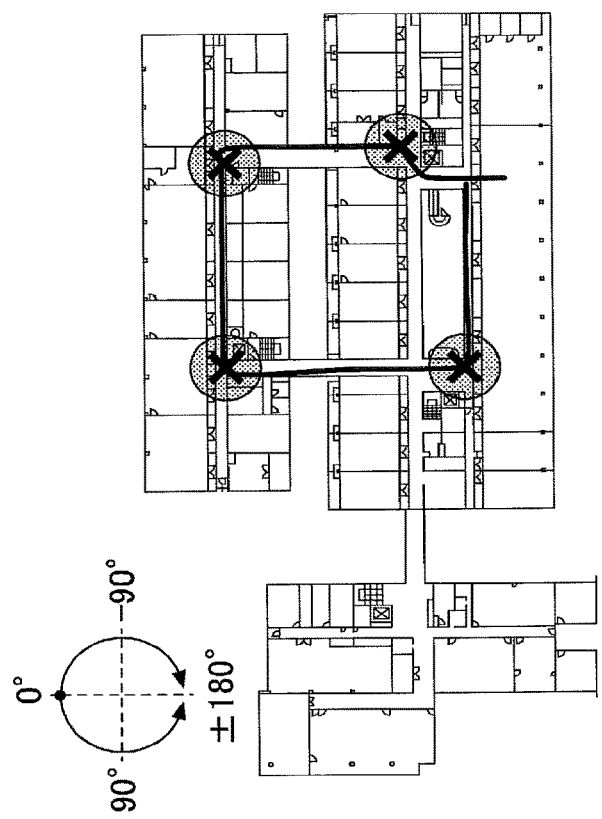
FIGS. 37A and 37B are drawings illustrating an example of comparing traveling trajectories of the user which are obtained in a conventional technique and in the technique according to the embodiment.
Figure 37A:
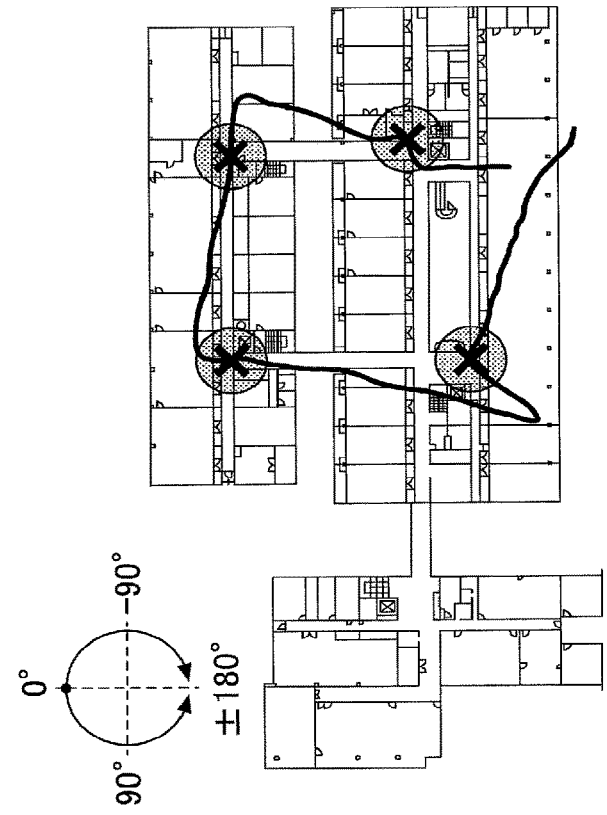

FIGS. 37A and 37B are drawings illustrating an example of comparing traveling trajectories of an observed object which are obtained in a conventional technique and in the technique according to the embodiment of the present invention. A traveling trajectory obtained in the conventional technique is illustrated in FIG. 37A, whereas a traveling trajectory obtained in the technique according to the embodiment of the present invention is illustrated in FIG. 37B. In FIG. 37A, accuracy of position estimation is decreased because estimation errors of azimuth angles and traveling velocities are superimposed onto positions estimated in the PDR system. In FIG. 37B, accuracy of position estimation is improved because a walking speed correcting parameter 705 and a yaw angle correcting value 704 are corrected based on absolute position information.

Even though, in the conventional technique, a current position is corrected to be exactly at an absolute position, it has been difficult to continuously maintain positioning accuracies because the positioning accuracy decreases as estimation errors of yaw angles and walking speeds are superimposed onto current positions estimated in the PDR system. In the technique of the present invention, the positioning accuracy is improved because a yaw angle and a walking speed as well as a current position are updated at a timing of receiving absolute position information.

OTHER EXAMPLE OF APPLICATION

Further, the present invention is not limited to these embodiments, but various variations and modifications may be made without departing from the scope of the present invention.

For example, although the position estimator 800 estimates a position in the PDR system by use of a Kalman filter as parametric statistics, and then corrects the estimated position based on absolute position information in the embodiment, other parametric statistics for estimation such as a particle filter and an α-β, filter, as well as an modified or an extended versions of such filters, may be alternatively employed. Furthermore, the positions may be estimated by use of a least-mean-square (LMS), a gradient method, etc.

Further, in the examples of configurations illustrated in FIG. 4, etc., processing unit is divided in accordance with main functions in order to help understanding processing performed in the inertial device 1. However, the present invention is not limited by the way the processing unit is divided into smaller units or the names of the respective units. The processing unit of the inertial device 1 may be divided into even smaller units in accordance with processing details. Further, the processing unit of the inertial device 1 may be divided into units so that each unit performs a broader range of processing.

Furthermore, although the inertial device 1 executes the whole processing in the embodiment of the present invention, the inertial device 1 may transmit detected outcomes, or acceleration, angular velocity, and geomagnetic field, to a server. In such a case, the server estimates a position of the inertial device 1 and then transmits information as to the position to the inertial device 1, which reduces processing load of the inertial device 1.

Here, the position P'1 in FIG. 1 is an example of a predetermined position. The first measurement-updating processor 502 and the second measurement-updating processor 503 are examples of a position corrector. The correcting parameter estimation processor 700 is an example of a correcting parameter calculator. The walking speed correcting parameter 705 is an example of a movement speed correcting parameter. The coordinate system conversion processor 106 is an example of a traveling direction corrector. The distance A is an example of a first distance. The distance B is an example of a second distance. The velocity corrector 350 is an example of a movement velocity corrector. The position storage. The absolute position information input unit 400 is an example of an absolute position information acquirer. The position 1001 is an example of an estimated position. The position P'2 is an example of a corrected position.

According to the disclosure of the present invention, an inertial device having an improved indoor positioning accuracy may be provided.

What is claimed is:

1. An inertial device, comprising:
processing circuitry configured to
estimate a traveling direction and a movement velocity, based on an output of a sensor;
generate an estimated position of the inertial device by use of an inertial navigation system, based on the estimated traveling direction and the estimated movement velocity;
acquire absolute position information from externally provided signals;
correct the estimated position based on the absolute position information and generate a corrected position, upon acquiring the absolute position information; and
correct the traveling direction based on a gap between a first direction from a predetermined position to the estimated position and a second direction from the predetermined position to the corrected position,
wherein the processing circuitry is further configured to correct the movement velocity based on (1) a first distance between a corrected position generated in response to acquiring the absolute position information in a lastly entered area and a corrected position generated in response to acquiring the absolute position information in a newly entered area, and (2) a second distance between the corrected position generated in response to acquiring the absolute position information in the lastly entered area and an estimated position generated before being corrected in response to acquiring the absolute information in the newly entered area.

2. The inertial device according to claim 1, wherein the processing circuitry is further configured to
calculate a direction correcting parameter for correcting the traveling direction, based on the gap between the first direction from the predetermined position to the estimated position and the second direction from the predetermined position to the corrected position, and
correct the traveling direction using the direction correcting parameter.

3. The inertial device according to claim 2, wherein the processing circuitry is further configured to
acquire the absolute position information each time the inertial device enters one of a plurality of areas in which the absolute position information, which corresponds to the one of the plurality of areas, is wirelessly provided,
calculate a movement speed correcting parameter for correcting the movement velocity, based on a ratio of the first distance to the second distance, correct the movement velocity based on the movement speed correcting parameter, and
generate the estimated position based on the corrected movement velocity.

4. The inertial device according to claim 3, wherein the processing circuitry is further configured to calculate the ratio of the first distance to the second distance, and multiply the movement velocity by the ratio in order to correct the movement velocity.

5. The inertial device according to claim 3, wherein the processing circuitry is further configured to calculate the ratio of the first distance to the second distance, and acquire a correction value from a table that associates the ratio and the correction value, and then multiply the movement velocity by the correction value in order to correct the movement velocity.

6. The inertial device according to claim 2, wherein the processing circuitry is further configured to estimate error information with regard to the estimated position at a time of correcting the estimated position using parametric statistics, and change values of the direction correcting parameter, depending on an amount of error included in the error information.

7. The inertial device according to claim 2, further comprising:
a position memory to store at least one estimated position generated by the processing circuitry in a chronological order, and
wherein the processing circuitry is further configured to acquire the absolute position information each time the inertial device enters one of a plurality of areas in which the absolute position information which corresponds to the one of the plurality of areas is wirelessly provided, and
calculate the direction correcting parameter, upon detecting, based on the at least one estimated position stored in the position memory, that a distance between the corrected position generated in response to acquiring the absolute position information in the lastly entered area and a latest one of the at least one estimated position generated before being corrected by the position corrector in response to acquiring the absolute position information in the newly entered area is further than a predetermined distance.

8. The inertial device according to claim 6, wherein the processing circuitry is further configured to estimate the error information with regard to the estimated position at the time of correcting the estimated position using the parametric statistics, and calculate the direction correcting parameter, upon detecting that the amount of error included in the error information is smaller than a threshold value.

9. The inertial device according to claim 2, wherein the processing circuitry is further configured to fix, by use of the direction correcting parameter, a direction cosine that is indicative of the traveling direction in a direction cosine matrix, and then multiply the output of the sensor by the fixed direction cosine matrix, in order to correct the traveling direction.

10. The inertial device of claim 2, wherein the processing circuitry is further configured to calculate a yaw angle as the direction correcting parameter.

11. A non-transitory computer-readable recording medium storing a program for causing a computer to execute a process, the process comprising:
estimating a traveling direction and a movement velocity, based on an output of a sensor;
generating an estimated position of an inertial device by use of an inertial navigation system, based on the estimated traveling direction and the estimated movement velocity;
acquiring absolute position information from externally provided signals;
correcting the estimated position based on the absolute position information and generating a corrected position, upon acquiring the absolute position information; and
correcting the traveling direction based on a gap between a direction from a predetermined position to the estimated position and a direction from the predetermined position to the corrected position,
wherein the method further comprises correcting the movement velocity based on (1) a first distance between a corrected position generated in response to acquiring the absolute position information in a lastly entered area and a corrected position generated in response to acquiring the absolute position information in a newly entered area, and (2) a second distance between the corrected position generated in response to acquiring the absolute position information in the lastly entered area and an estimated position generated before being corrected in response to acquiring the absolute information in the newly entered area.

12. A method for positioning, the method comprising:
estimating a traveling direction and a movement velocity, based on an output of a sensor;
generating an estimated position of an inertial device by use of an inertial navigation system, based on the estimated traveling direction and the estimated movement velocity;
acquiring absolute position information from externally provided signals;
correcting the estimated position based on the absolute position information and generating a corrected position, upon acquiring the absolute position information; and
correcting the traveling direction based on a gap between a direction from a predetermined position to the estimated position and a direction from the predetermined position to the corrected position,
wherein the method further comprises correcting the movement velocity based on (1) a first distance between a corrected position generated in response to acquiring the absolute position information in a lastly entered area and a corrected position generated in response to acquiring the absolute position information in a newly entered area, and (2) a second distance between the corrected position generated in response to acquiring the absolute position information in the lastly entered area and an estimated position generated before being corrected in response to acquiring the absolute information in the newly entered area.

* * * * *